March 17, 1970 J. D. GRANDINE 2ND 3,501,624

HYBRID COMPUTER INCORPORATING A STORED PROGRAM DIGITAL COMPUTER OF THE SOURCE-DESTINATION TYPE

Filed Oct. 22, 1965 20 Sheets-Sheet 1

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

HYBRID COMPUTER INCORPORATING A STORED PROGRAM DIGITAL COMPUTER OF THE SOURCE-DESTINATION TYPE
Filed Oct. 22, 1965

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

March 17, 1970 J. D. GRANDINE 2ND 3,501,624
HYBRID COMPUTER INCORPORATING A STORED PROGRAM DIGITAL COMPUTER OF THE SOURCE-DESTINATION TYPE
Filed Oct. 22, 1965 20 Sheets-Sheet 18

INVENTOR.
JOSEPH D. GRANDINE, II
BY
Kenway, Jenney & Hildreth
ATTORNEYS

March 17, 1970 J. D. GRANDINE 2ND 3,501,624

HYBRID COMPUTER INCORPORATING A STORED PROGRAM DIGITAL COMPUTER OF THE SOURCE-DESTINATION TYPE

Filed Oct. 22, 1965 20 Sheets-Sheet 19

INVENTOR.
JOSEPH D. GRANDINE, II
BY
Kenway, Jenney & Hildreth
ATTORNEYS

INVENTOR.
JOSEPH D. GRANDINE, II
BY
Kenway, Jenney & Hildreth
ATTORNEYS

United States Patent Office 3,501,624

Patented Mar. 17, 1970

3,501,624

HYBRID COMPUTER INCORPORATING A STORED PROGRAM DIGITAL COMPUTER OF THE SOURCE-DESTINATION TYPE

Joseph D. Grandine 2nd, Wellesley, Mass., assignor to Adage, Inc., Boston, Mass., a corporation of Massachusetts Filed Oct. 22, 1965, Ser. No. 500,740
Int. Cl. G06j *1/00*
U.S. Cl. 235—150.5 17 Claims

ABSTRACT OF THE DISCLOSURE

The hybrid computer disclosed herein employs a hybrid computing array having digital input and output registers as well as analog input and output terminals. The system further incorporates a stored program digital computer of the source-destination type which includes the input and output registers of the hybrid array among its source and destination registers, respectively.

My invention relates to information processing systems, and particularly to a novel general purpose hybrid computer for performing sequential operations on both digital and analog signals.

The relative advantages of analog and digital information processing apparatus are well known. Where the required precision admits of their use, analog techniques are preferred for performing complex functional transformations in real time, employing a plurality of arithmetic operators acting in parallel. On the other hand, for such applications as sorting, tabulating and accounting, where a large number of operations must be performed, where storage and logical control are necessary, or where the required precision is high, digital equipment is preferred.

Recognizing that there are numerous information processing operations that cannot be carried out efficiently by either an analog computer or a digital computer, a number of attempts have been made to combine analog and digital computing techniques to produce a hybrid computer having enhanced capabilities. A straight-forward approach to the design of such a hybrid machine is to interconnect an analog computer and a digital computer through linkage equipment which includes signal converters, producing a hybrid computer capable of dealing efficiently with a larger class of problems than could either computer alone. However, such computers are very expensive since they generally require a general purpose digital computer, a general purpose analog computer and complex linkage equipment. A second type of hybrid computer that has been widely exploited is formed by adding digital elements to a conventional analog computer. A third form of hybrid computer that has met with acceptance comprises a conventional digital computer to which analog elements have been added, whereby the capabilities of the arithmetic unit of the digital computer are extended. However, hybrid computers of all three classes are characterized by a predetermined balance between digital and analog capabilities that inherently restricts the class of operations which can be most efficiently performed by a particular computer. It is the object of my invention to extend the class of operations that can best be performed by a computer of given cost, speed and complexity.

Briefly, a hybrid computer in accordance with my invention comprises a hybrid computing array including a set of input terminals to which analog input signals may be applied, and a set of one or more output terminals on which analog output signals can be produced. A set of analog computing elements are interconnected by a set of digitally controllable switches to form a digitally controllable hybrid computing network having a transfer function determined by the state of selected ones of the switches. The hybrid array further includes a value register, a control register, and preferably an output register. The registers are adapted to store digital signals, and are employed in combination with a novel digital computer of my invention. Broadly, the digital computer is of the "source-destination" type, and the registers in the computing array are given source and destination assignments. Specifically, the value and control registers are given different sets of one or more destination assignments, and the output register is given one or more source assignments in the computer.

The digital portion of the hybrid computer of my invention is, as noted above, a digital computer of the "source-destination" type. It includes an instruction register for storing an instruction, and a digital data channel under the control of the instruction register for transferring digital data from a selected source to a selected destination, with such intemediate logical transformations as may be directed by the stored instruction. A set of registers for performing various computing and processing functions are provided and given additional source and destination assignments, and a digital memory subsystem is provided for storing a program of instructions, data, and computation results. By this arrangement, the various conventional digital computing functions can be performed by transferring information from a selected source to a selected destination register with intermediate logical and arithmetic operations. In addition, computing operations may be performed on a mixture of analog and digital signals by the hybrid computing array in accordance with transformation functions selected by the program stored in the memory system. The hybrid portion of the system may thus be assigned a greater or a lesser part in the information processing operation under program control, and the nature of the transformation made upon the analog and digital input signals may be changed under program control. Accordingly, a very wide class of processing operations can be performed at high speed by apparatus of relatively small cost and complexity. Computers made according to my invention find substantial use in processing in real time data from a plurality of analog sources.

In accordance with a second aspect of my invention, I preferably provide, in combination with the hybrid computer described above, a novel program interrupt system for allowing the execution of the stored program in the memory to be interrupted from time to time by one of a selected number of devices requesting service, service being provided to these devices on the basis of assigned priorities. For each priority level incorporated in the system, a channel is provided which comprises facilities for storage of a request for service until all higher priority requests have been carried out, apparatus for entering an instruction from an external source associated with each priority channel when no higher priority channel is active, and means for holding the computer under the control of the channel having the highest priority until the requested service has been completed. This arrangement has a number of advantages, one of the most important being that it facilitates asynchronous real time operation with external devices. The program interrupt system also facilitates the initial storage of programs and data, and the performance of error sub-routines in the event that error is detected during a programmed operation.

The construction and mode of operation of the hybrid computer of my invention will best be understood in the light of the following detailed description, together with the accompanying drawings, of a preferred embodiment thereof.

Figure 1:
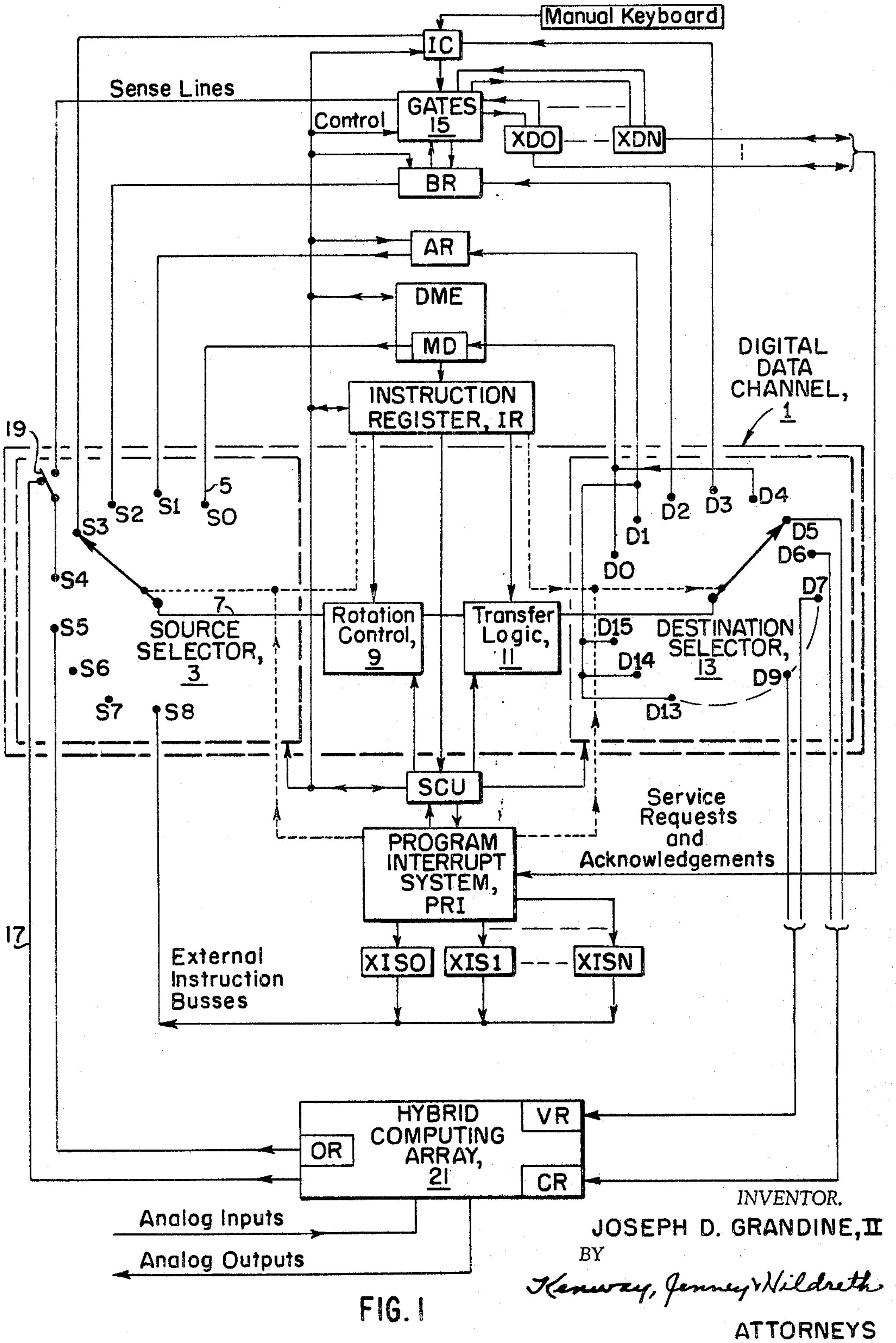
FIG. 1 is a functional block and line diagram of a hybrid computer made in accordance with my invention.
Figure 5:
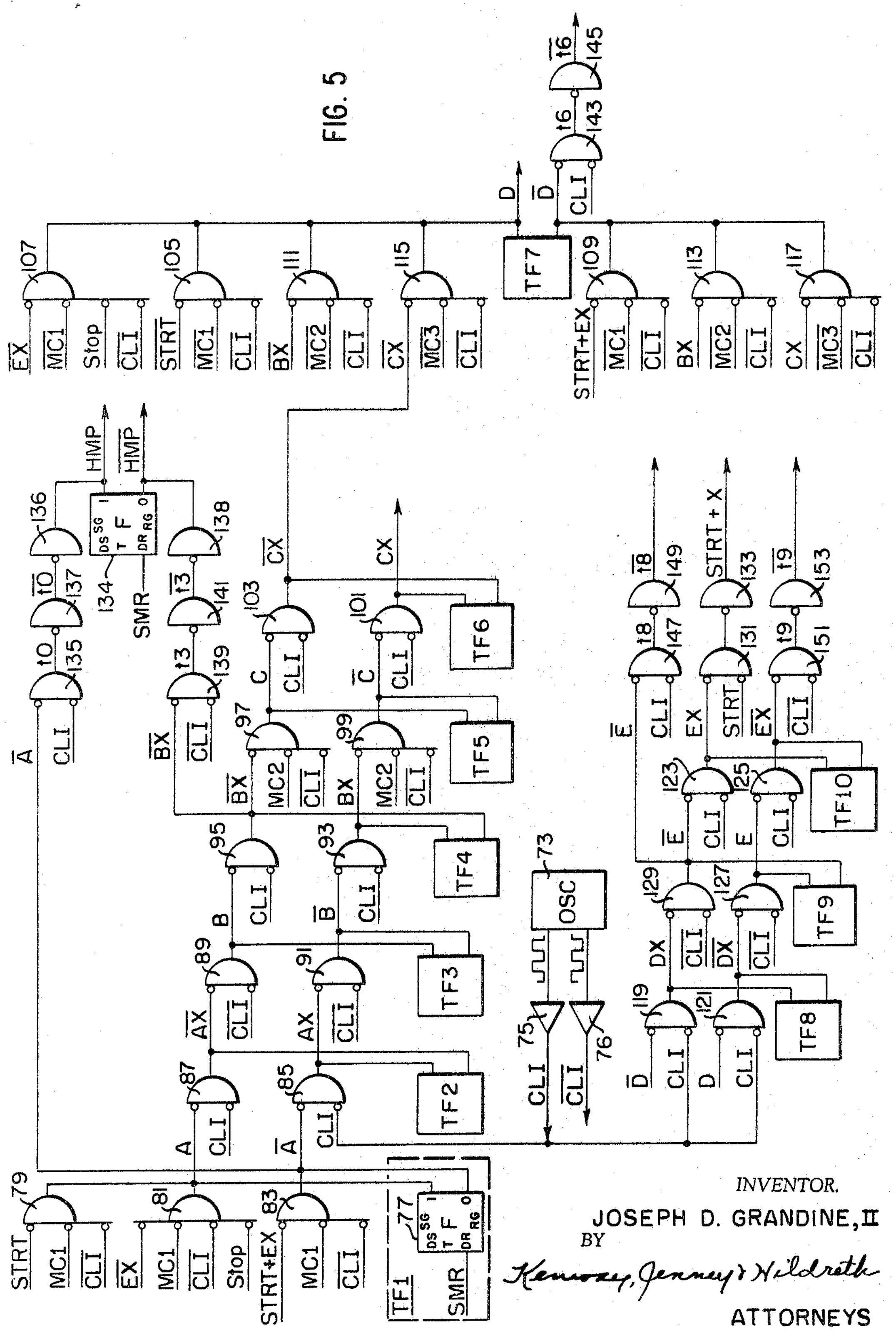
Figures 6, 7, 8:
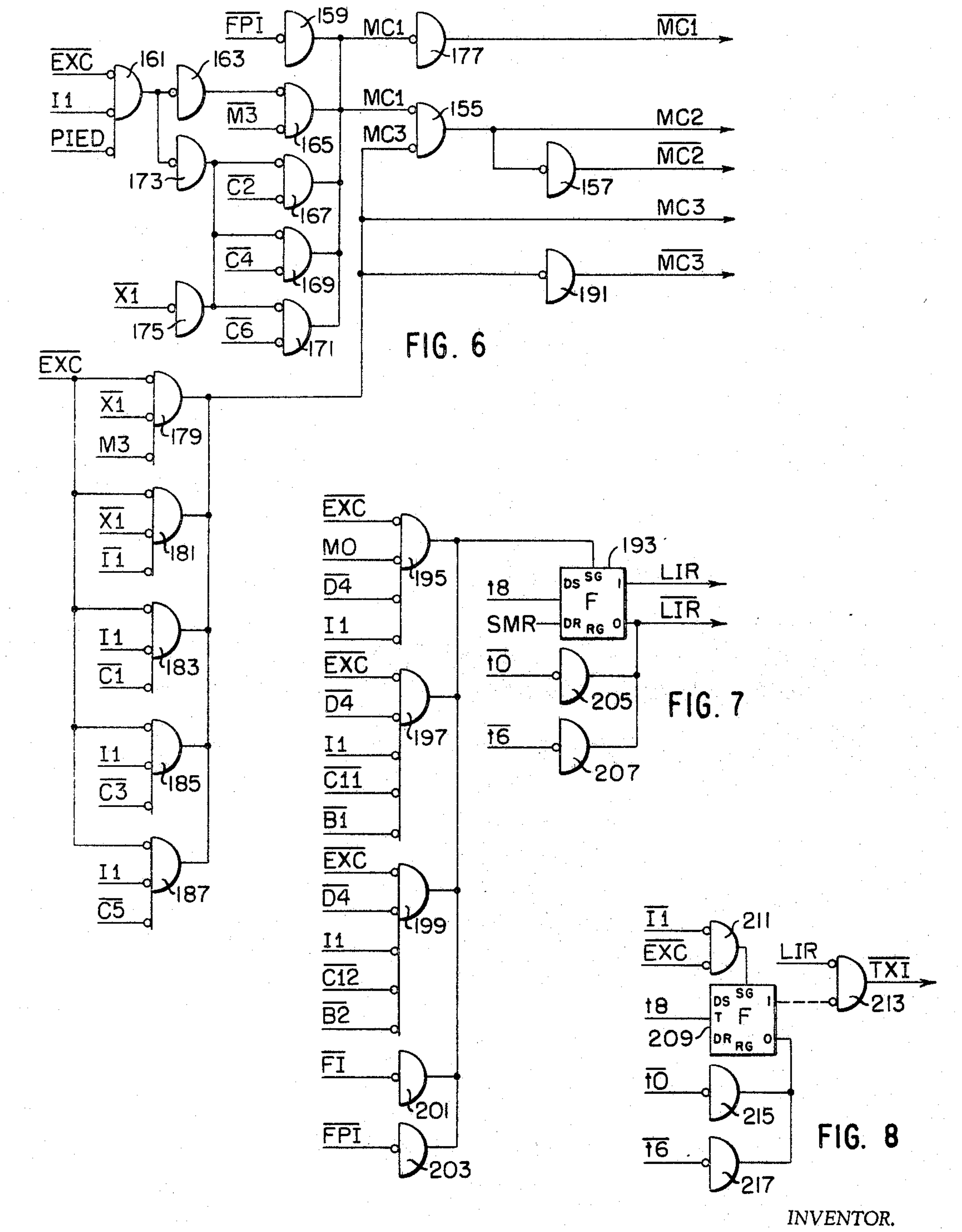
Figures 9A, 9B, 9C:
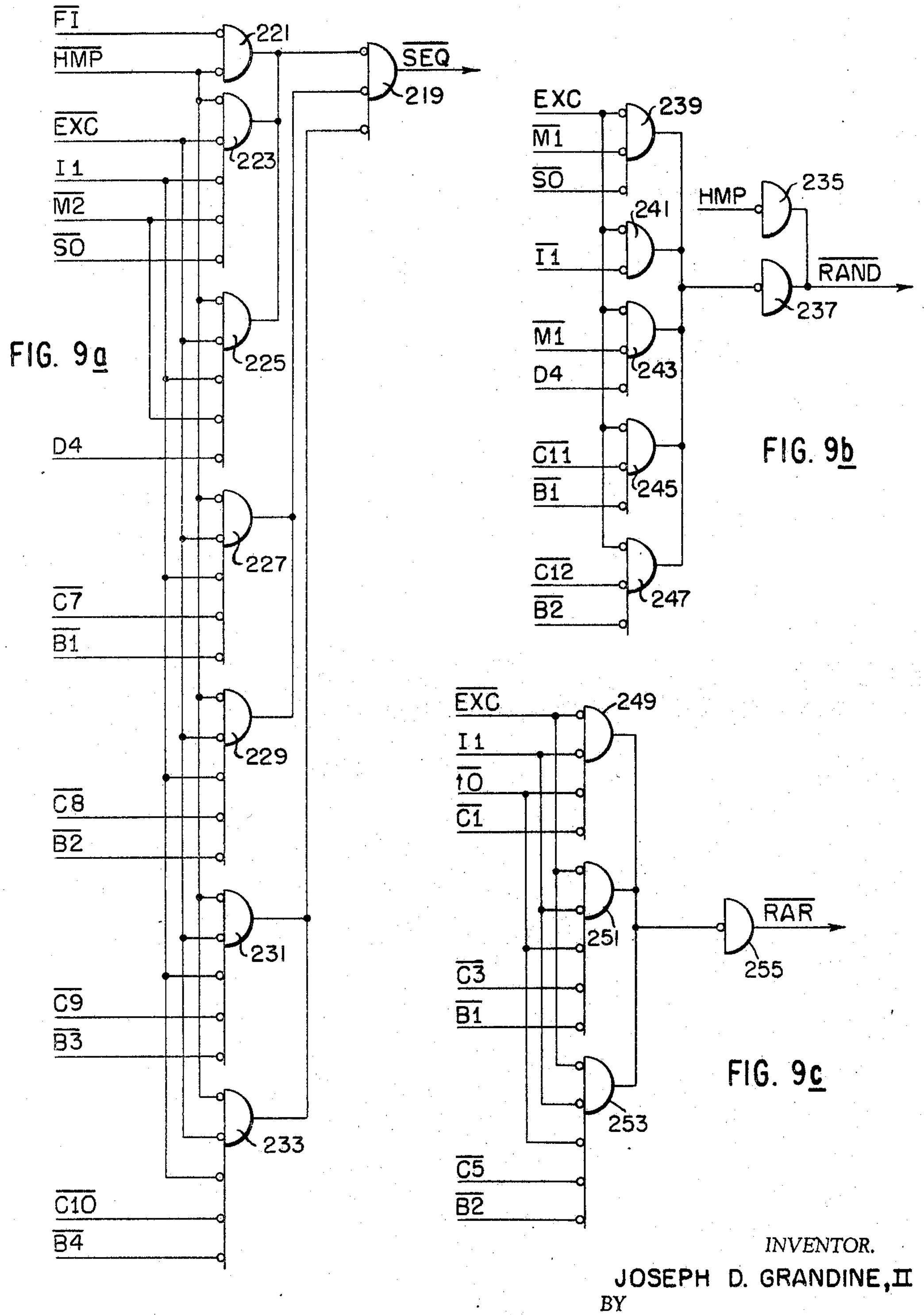
Figure 10A:
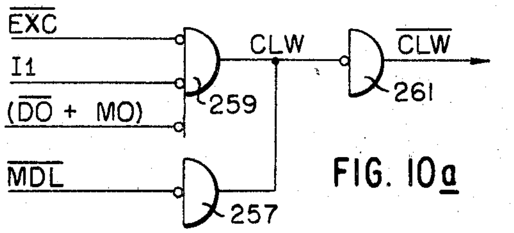
Figure 10B:
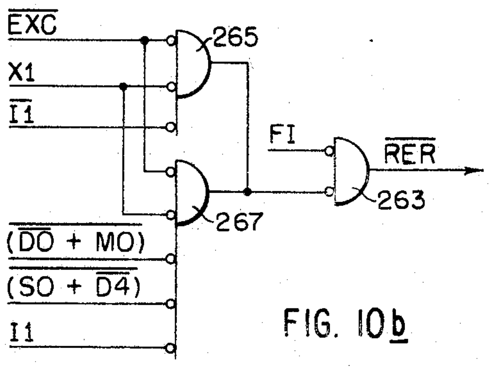
Figure 10C:
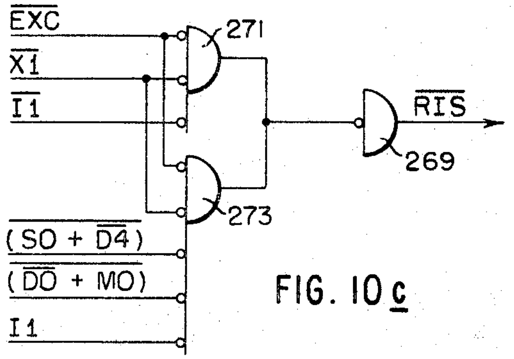
Figure 11A:
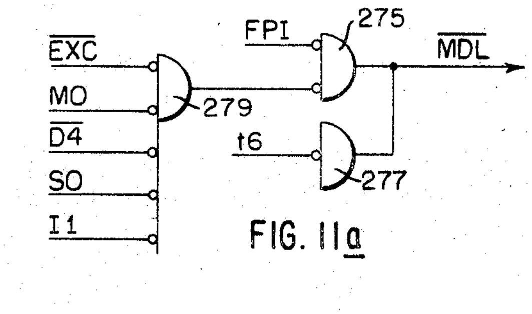
Figure 11B:
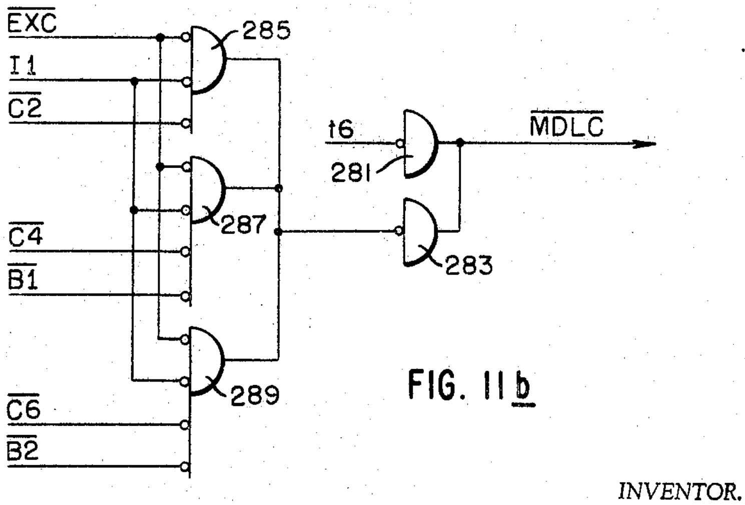
Figure 12:
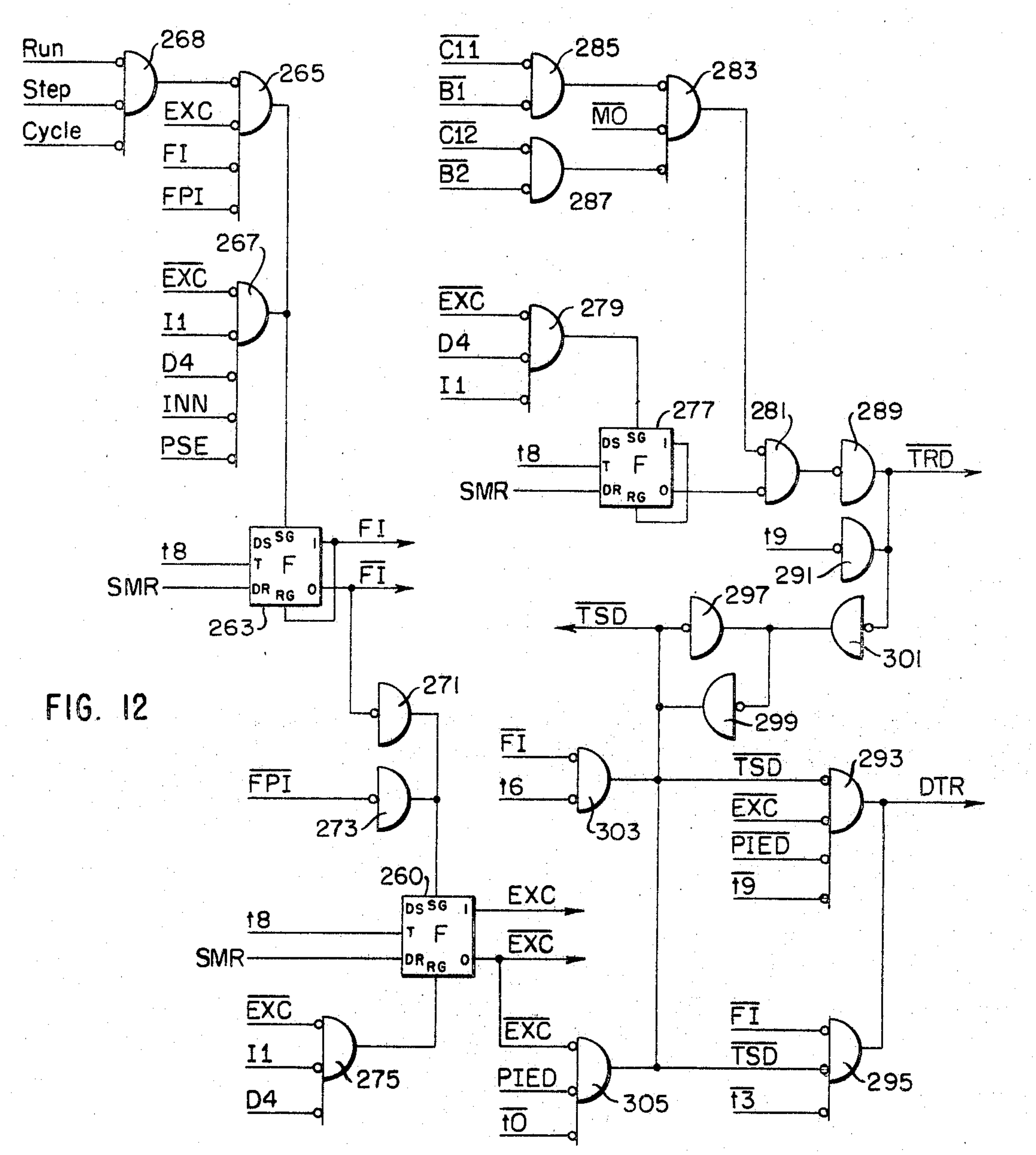
Figure 15A:
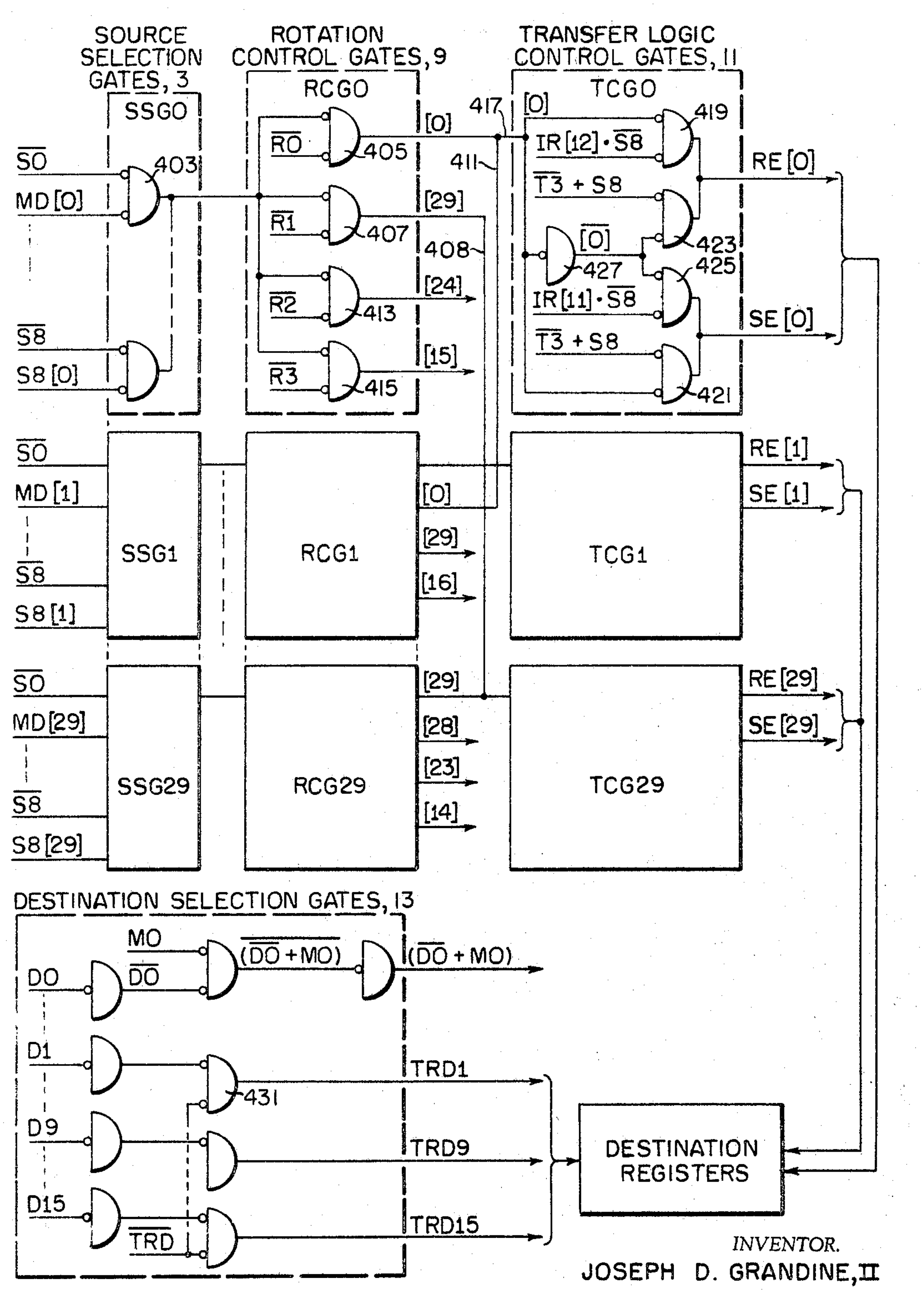
Figure 15B:
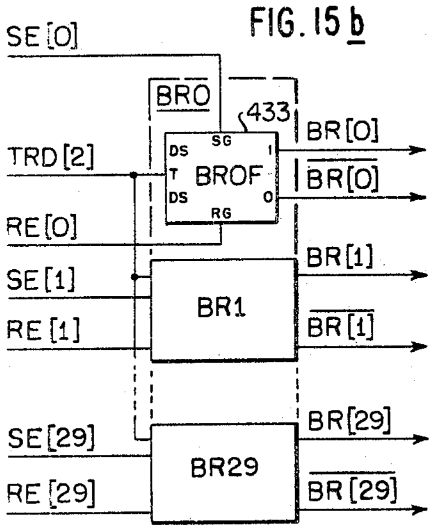
Figure 18:
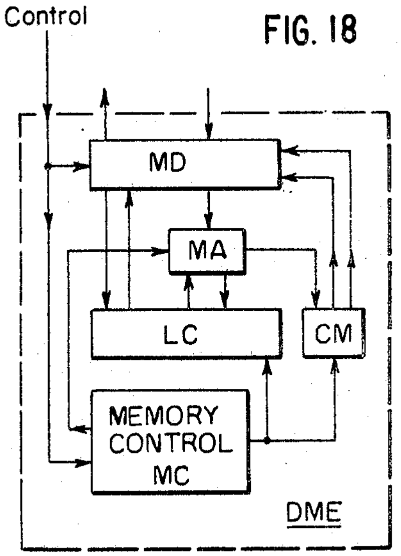
Figure 17:
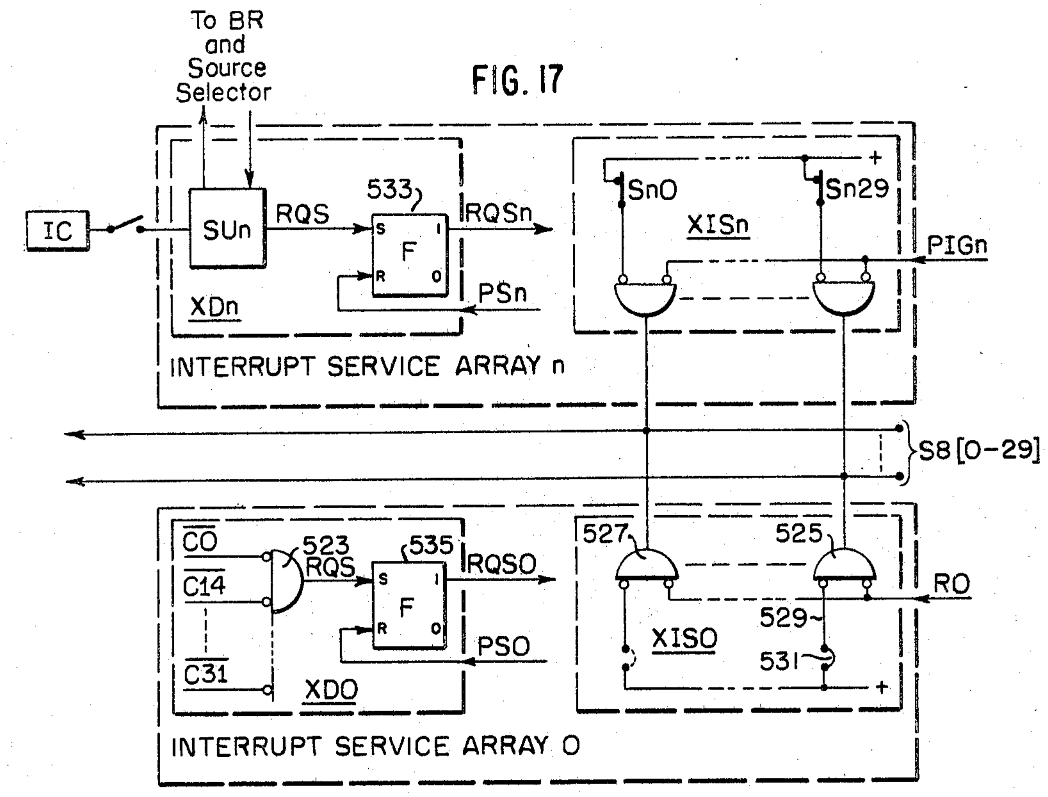
Figure 19:
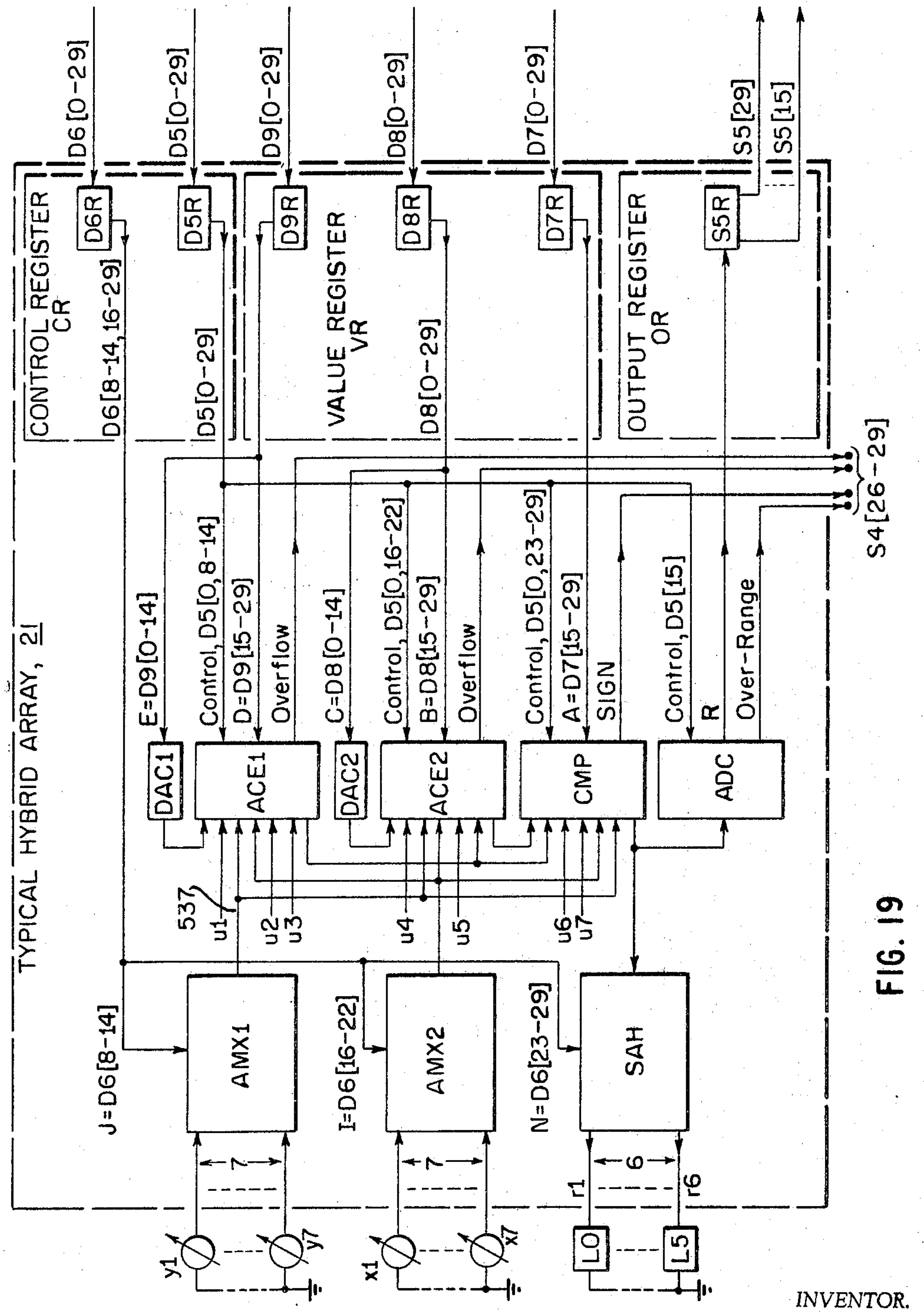
Figure 20:
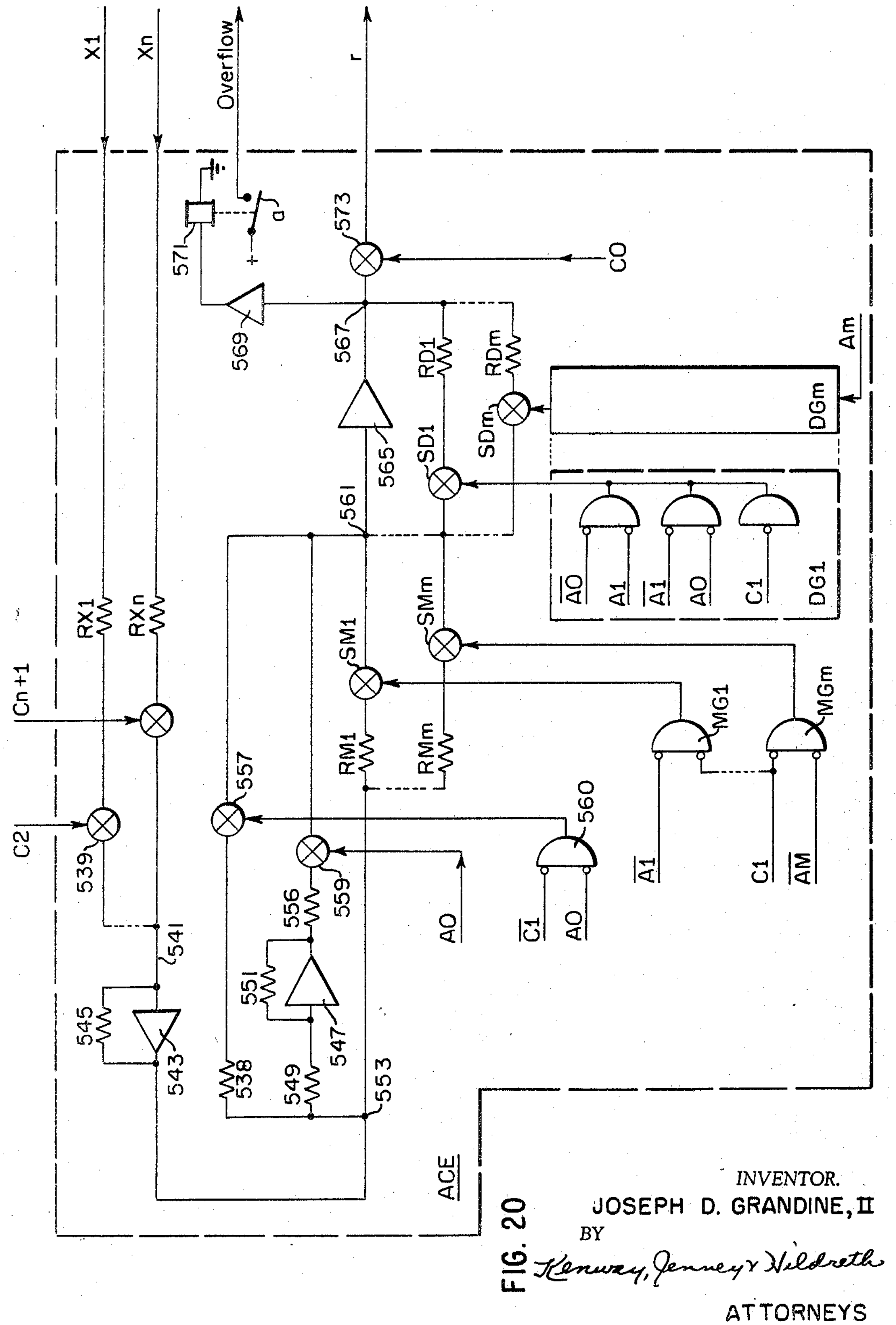
Figure 21:
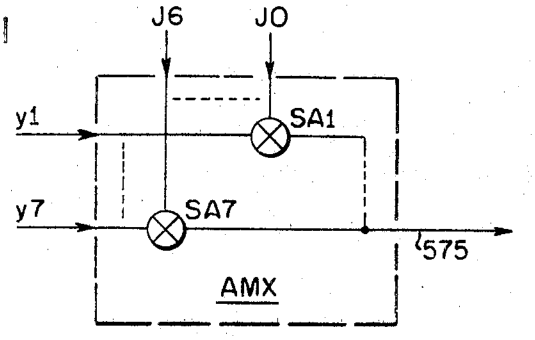
Figure 22:
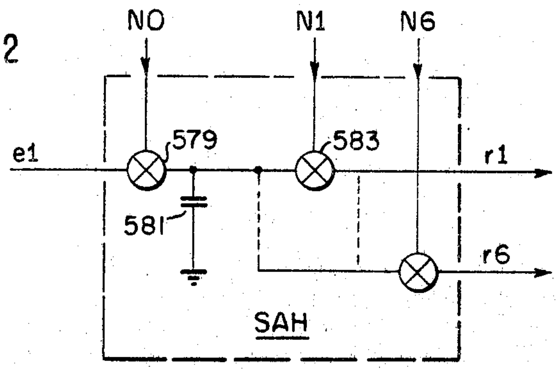
Figure 23:
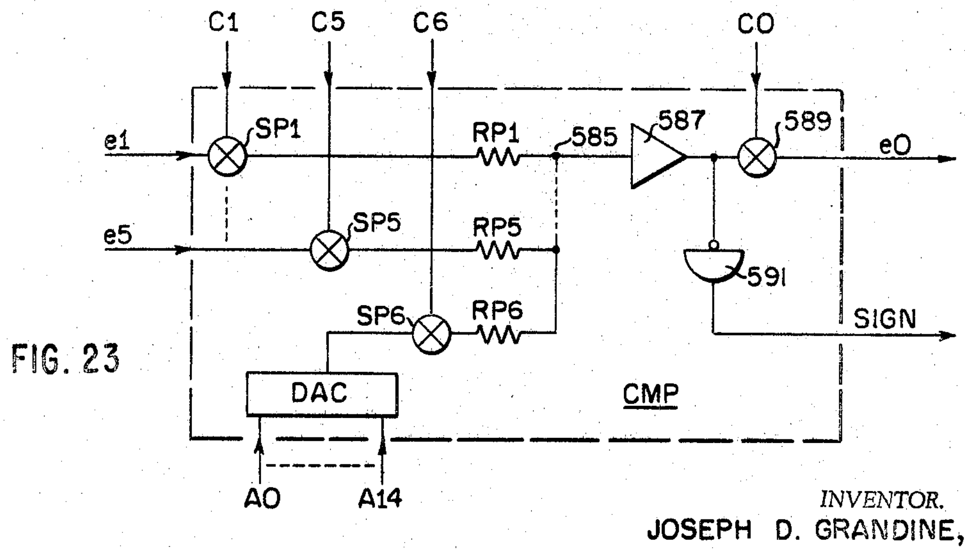
Figure 24A:
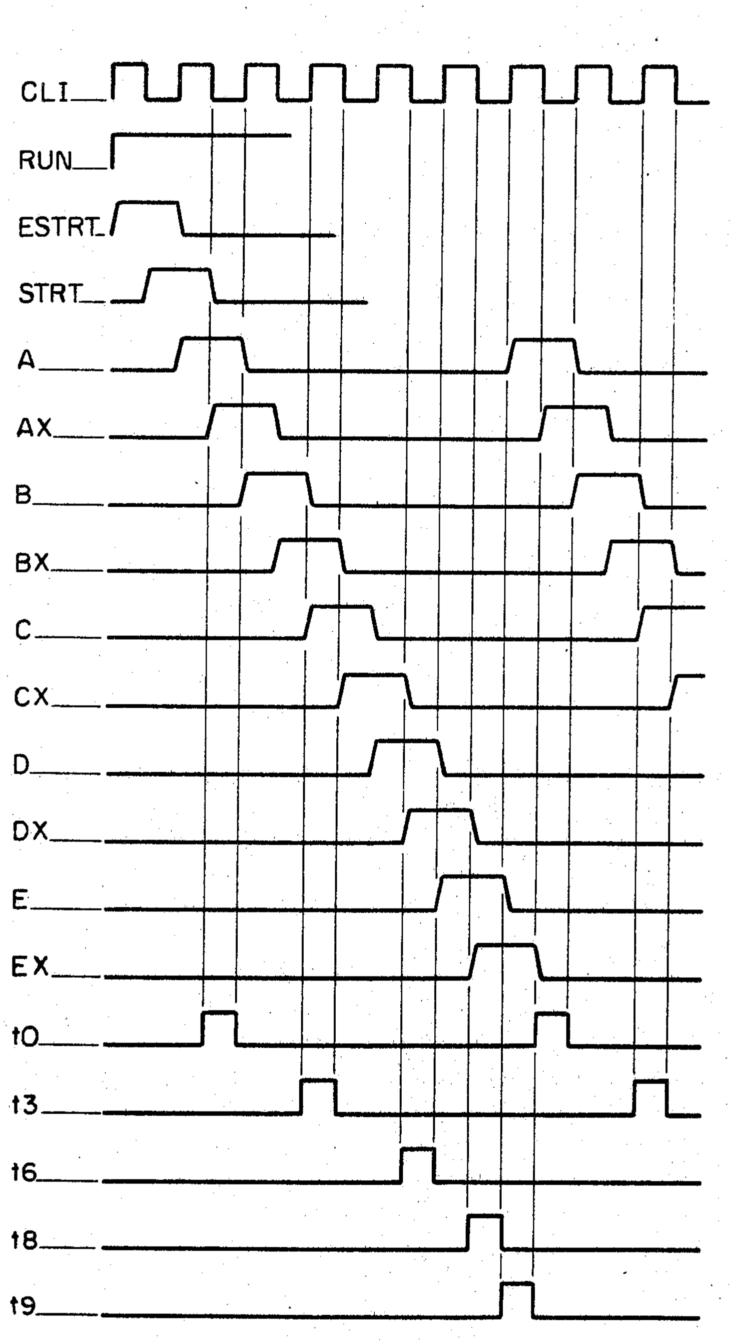
Figure 24B:
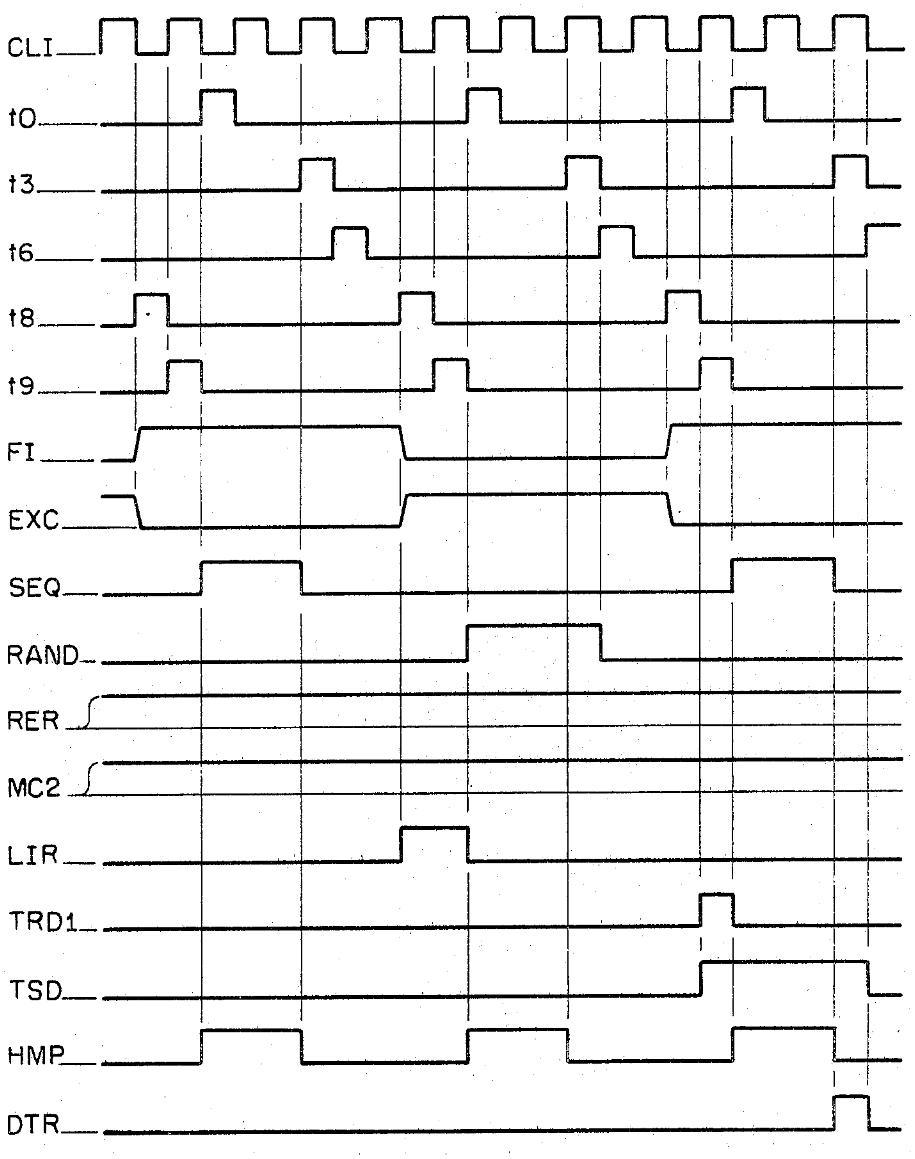
Figure 24C:
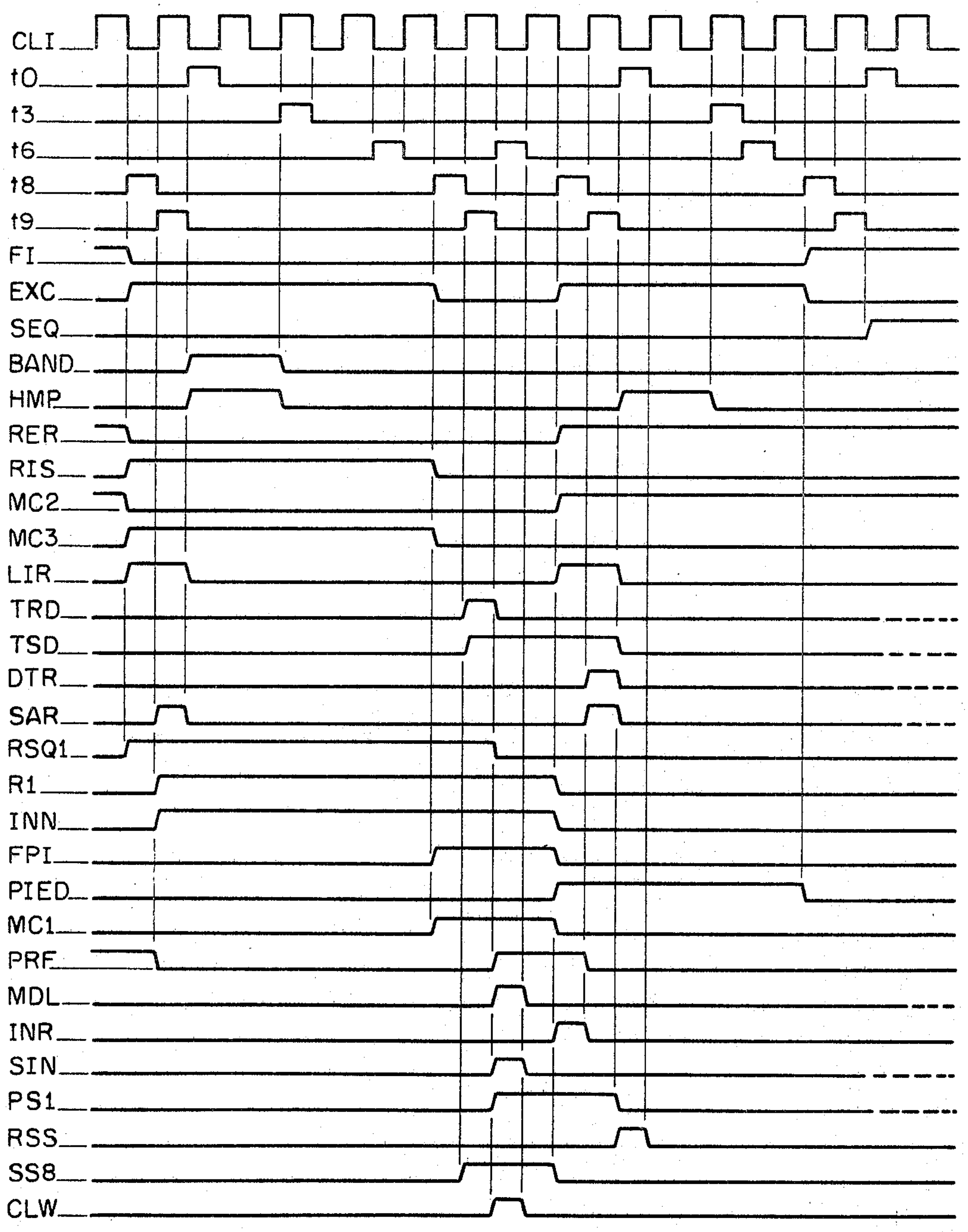

FIGS. 4 through 13 comprise schematic wiring diagrams of circuits forming portions of the system control unit of the computer of FIG. 1; more particularly;

FIGS. 4*a* through 4*h* comprise a schematic wiring diagram of operation mode control circuits in the system control unit;

FIG. 5 comprises a schematic wiring diagram of the machine cycle counter and associated timing circuits;

FIG. 6 comprises a schematic wiring diagram of the machine cycle duration control circuits;

FIG. 7 comprises a schematic wiring diagram of a circuit used to control the loading of a portion of the instruction register of FIG. 1;

FIG. 8 comprises a schematic wiring diagram of a control circuit for loading the remainder of the instruction register of FIG. 1;

FIGS. 9*a*, 9*b* and 9*c* show memory cycle mode control circuits;

FIGS. 10*a*, 10*b* and 10*c* show memory control circuits;

FIGS. 11*a* and 11*b* show memory data register control circuits for loading the memory data register forming a portion of the computer of FIG. 1;

FIG. 12 comprises a schematic wiring diagram of control circuits for the fetching and execution of instructions in the computer of FIG. 1;

FIGS. 13*a*, 13*b*, 13*c* and 13*d* comprise schematic wiring diagrams of logic circuits for detecting branch conditions in the computer of FIG. 1;

FIGS. 14*a*, 14*b*, 14*c*, 14*d*, 14*e* and 14*f* comprise schematic wiring diagrams of the instruction register of FIG. 1 and associated instruction decoding circuits;

FIG. 15*a* comprises a schematic wiring diagram of a digital data channel forming a part of the computer of FIG. 1;

FIG. 15*b* comprises a schematic wiring diagram of a buffer register forming a part of the computer of FIG. 1;

FIGS. 16*a*, 16*b*, 16*c* and 16*d* comprise schematic wiring diagrams of circuits forming a portion of the program interrupt system of the computer of FIG. 1;

FIG. 17 comprises schematic wiring diagrams of typical interrupt service arrays comprising external devices serviced by the program interrupt system of FIG. 16 and associated external instruction sources;

FIG. 18 comprises a block diagram of a memory subsystem forming a portion of the computer of FIG. 1;

FIG. 19 comprises a schematic wiring diagram of a typical hybrid array suitable for use in the computer of FIG. 1;

FIG. 20 comprises a schematic wiring diagram of a hybrid computing element forming a portion of the array of FIG. 19;

FIG. 21 comprises a schematic wiring diagram of a multiplexing circuit suitable for use in the array of FIG. 19;

FIG. 22 comprises a schematic wiring diagram of a sample-and-hold circuit forming a part of the array of FIG. 19;

FIG. 23 comprises a schematic wiring diagram of a comparator forming a portion of the array of FIG. 19; and FIGS. 24*a*, 24*b* and 24*c* comprise schematic timing diagrams illustrating the operation of the computer of FIG. 1 under typical conditions.

To facilitate an understanding of the hybrid computer of my invention, the specification is provided with headings and sub-headings indicating the subject matter to which each section relates. The headings and sub-headings are listed below in the order in which they appear in the specification:

(I) INTRODUCTION AND GENERAL DESCRIPTION (II) THE DIGITAL SYSTEM CONTROL UNIT

- (A) Computer Operation Control Circuits
- (B) Computer Cycle and Timing Circuits
- (C) Machine Cycle Duration Control Circuits
- (D) Memory Control Circuits
- (E) Program Branch Condition Detecting Circuits (III) THE INSTRUCTION REGISTER (IV) THE DIGITAL DATA CHANNEL (V) THE PROGRAM INTERRUPT SYSTEM (VI) THE DIGITAL MEMORY SYSTEM (VII) THE HYBRID ARRAY

- (A) Construction
- (B) Operation (VIII) COMPUTER OPERATION

(I) INTRODUCTION AND GENERAL DESCRIPTION

In the drawings, and particularly in FIG. 1, I have shown in functional form a typical hybrid computer in accordance with a preferred embodiment of my invention. For simplicity, the computer to be descrcibed has certain fixed parameters which are chosen merely for purposes of illustration and because they are representative of practical values of the parameters that have been found useful. For example, the computer to be described is capable of handling words 30 bits in length, and is provided with 8 normal source assignments, one special source assignment and 16 destination assignments. It will be apparent to those skilled in the art that these and other such values to be described are merely for illustration, and that other values could be employed without departing from the scope of my invention.

As shown in FIG. 1, the hybrid computer of my invention comprises a digital data channel 1 for the transmission of digital signals from a selected source to a selected destination. The source is selected from one of nine by a source selector schematically indicated at 3 under the control of the instruction register IR and a program interrupt system PRI, to be described.

Normal source selection is under the control of the instruction register IR. Depending on the instruction stored in the instruction register, one of eight normal sources S0 through S7 may be selected. Each source comprises 30 terminals to which a 30 bit digital word may be applied, with each of the leads such as lead 5 representing 30 such leads. Information from the selected source passes over the 30 leads indicated schematically by the lead 7 through a rotation control 9 and transfer logic 11 to a destination selector 13. By means of the destination selector 13, under the control of the instruction register IR and a system control unit SCU, to be described, information is channeled to one of 16 selected destinations D0 through D15. As indicated for the destinations D0 and D4, and also for the destination terminals D1, D13, D14 and D15, certain of the destinations selected by the destination selector 13 may be the same. The reason for multiple destination assignments of this kind is that the destination code stored in the instruction register IR is used in the hybrid computer of my invention to perform functions other than the selection of the destination. Specifically, it may be desired either to transfer to one register via another register having a different destination assignment, or to transfer to the same register with a different transformation than that which can be effected by simple copying or by use of the rotation control 9 and transfer logic 11. The transfer logic capability is thus extended by the use of the destination code, even though the actual transfer of information may be to the same destination for different destination assignments. The advantages of this arrangement will be more apparent as the description proceeds.

Information transfer and the fetching and execution of instructions are timed by a system control and timing unit SCU, schematically indicated as connected for control purposes to most of the other elements of the digital computer shown in FIG. 1. As indicated, the system control and timing unit SCU is also influenced by the instruction stored in the instruction register IR.

The instruction register IR is loaded from a conventional digital core memory comprising a memory data register MD. In the specific embodiment to be described, the instruction register IR is a 15 bit register, and the memory data register MD is a 30 bit register. The instruction register normally receives binary bits 0 through 14 stored in the memory data register, whereas the bits 15 through 29 in the memory data register normally store either an address associated with the instruction or a digital value. Digital values stored in the memory data register MD may be either single range values of 14 bit precision plus a sign bit, or double precision values comprising 29 bits plus a sign bit. The memory data register is given the source assignment S0 and the destination assignment D0. Its contents may thus be supplied to any register in the system having a destination assignment, and it may be loaded from any register in the system having a source assignment. In addition, the memory data register is interconnected with a digital core memory subsystem DME, for the exchange of information. The memory subsystem will be described in further detail below.

In the computer shown, an accumulator AR, of conventional construction is preferably provided. The accumulator may comprise two thirty bit registers interconnected by logic circuits in a conventional manner to perform arithmetic operations by the gated transfer of data from one register to the other. One register serves as a "source" and the other as a "destination" register for the accumulator. The accumulator AR is given the source assignment S1 and the destination assignments D1, D13, D14 and D15. When the destination D1 is selected, the accumulator is loaded under the control of apparatus selected by the associated destination code to perform one of three predetermined arithmetic functions. When the destination D13 is selected, a single precision range value is added to the contents of the accumulator. When D14 is selected, an extended range value is added to the contents of the accumulator. When D15 is selected the resultant transfer to the accumulator is the logical exclusive OR function of the contents of the accumulator AR and the contents of the selected source. Other destination assignments for carrying out other selected transformations at the destination AR may also be provided, if so desired.

The destination D2 and the source S2 are assigned to a conventional 30 bit buffer register BR. This register is provided to exchange information with external devices, such as typewriter or a tape reader, or a magnetic tape unit or the like. Conventional gates 15, dependent upon the number and nature of the external devices, may be provided, for control jointly by any of a plurality of external devices XDO through XDN, and the system control unit SCU. Control can also be exercised over the gates 15 by an interface control register IC, of 30 bit capacity, which can be loaded either by the selection of destination D3 or by manual inputs from a manual keyboard, not shown. The interface control register is assigned the source designator S3 and the destination designation D3 for normal data transfer in the computer.

The selection of the destination D4 results in a transfer of data to the instruction register IR, by way of the memory data register MD. For this purpose, the destination code D4 both selects MD as the immediate destination for the data, and is used to form a signal commanding loading of the instruction register IR from the register MD.

A group of up to 30 sense lines 17 are given the source assignment S4, and, as schematically indicated by the switch 19, may either be connected through the gates 15 to report the status of one or more of the external devices XDO through XDN, or may be connected to sense the status of elements of a hybrid computing array 21, to be described. As indicated schematically in FIG. 1, the source S5 is assigned to an output register OR forming part of the hybrid computing array 21. A control register CR, also forming part of the hybrid computing array 21, is given the destination assignments D5 and D6, and a value register VR is given one or more destination assignments, here shown as the destinations D7 through D9. The sources S6 and S7, and the destinations D10 through D12, are not shown assigned in FIG. 1. These sources and destinations may optionally be connected to additional subsystems that may be provided in the computer.

A program interrupt sub-system PRI, to be described, is associated with the external devices XDO through SDN. For each external device there is an associated external instruction source XISO through XISN. As will appear, in some instances it may be desired to use the same external instruction source with a number of external devices, which may be accomplished by mechanical or electronic switching. In accordance with preassigned priorities of the devices XDO through XDN, and in response to service requests from the devices, the program interrupt system PRI functions for each service request to gate an instruction from the associated instruction source over external instruction busses S8. The selection of the source S8 by the program interrupt system overrides the system control unit SCU. When the program interrupt system is active, the external instruction busses are selected as the source and the memory data register MD is selected as the destination. After loading an external instruction into the memory data register, the fifteen instruction bits are transferred to the instruction register, whereupon execution of the instruction takes place. The execution of the instruction may require the computer to perform a subroutine which is stored in the computer memory and this in turn may require a number of machine cycles. At the end of the requested service, including the performance of any sub-routine, control is returned to the stored program and this program is continued from the point at which it was interrupted. It should be noted that the external sources associated with the program interrupt system may supply both an instruction and data to the computer. Thus both the internal stored program and the data channel may be interrupted. This is in contrast to conventional digital computers which provide for either a data interrupt or a program interrupt, but do not provide the capability for complete interruption of the stored program and data as does the computer of my invention. It should also be noted that any instruction including a jump to a sub-routine which the computer is capable of executing may be supplied from the priority interrupt system.

Figures 2, 3, 4A, 4B, 4C, 4D, 4E, 4F, 4G, 4H:
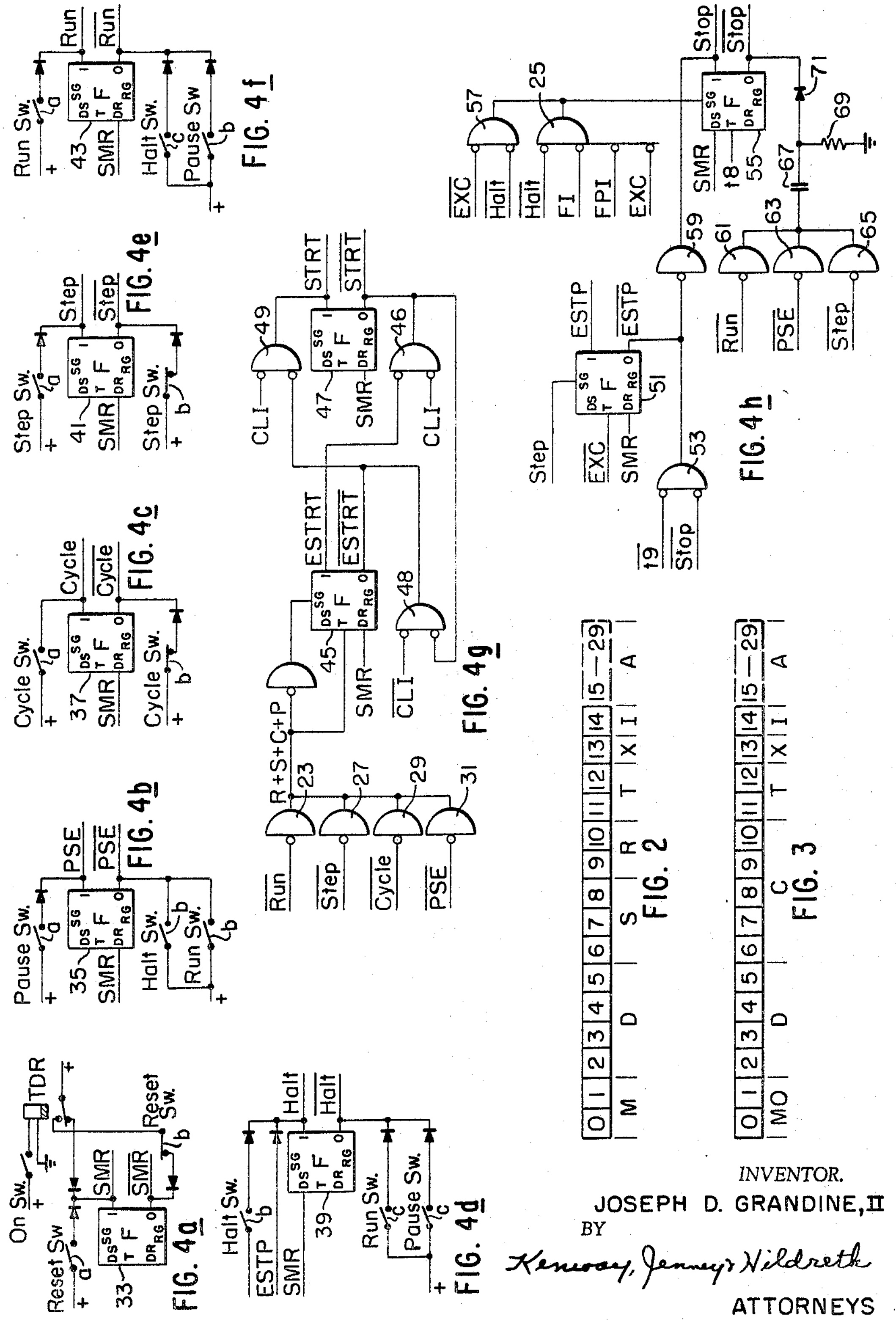
FIG. 2 is a schematic diagram illustrating field assignments in the instruction register of the computer of FIG. 1 used for normal instructions.
FIG. 3 is a schematic diagram similar to that of FIG. 2 and showing field assignments for special instructions in the instruction register of FIG. 1.

Instructions for the computer are normally interpreted in accordance with the format shown in FIG. 2, but provision is made for special instructions interpreted in accordance with the format of FIG. 3. Referring first to FIG. 2 (on sheet 4) each instruction is stored in the digital memory sub-system DME as a 30 bit word comprising a 15 bit instruction and a 15 bit address associated with the instruction. The instruction portion comprises the bits 0 through 14, and the address portion comprises the bits 15 through 29. The first two bits 0 and 1 in the instruction register determine the instruction mode. If these bits comprise 01, 10, or 11, corresponding to instruction modes M1, M2 and M3, the instruction is interpreted as a normal instruction.

The bits 2, 3, 4 and 5 in the instruction register comprise a destination code. As noted above, this code specifies both the destination and in some instances a particular operation to be carried out in the transfer to the destination.

The bits 6, 7 and 8 of the normal instruction comprise a source code identifying one of the normal sources S0 S7. In the computer shown in FIG. 1, since sources S6 and S7 are unassigned, the corresponding codes could be used to specify additional data transformation functions if desired and if the corresponding functions were implemented.

The bits 9 and 10 in the instruction register normally affect the rotation control circuits 9. This control may cause these circuits to make a 0, 1, 6, or 15 bits shift left of the transferred data. As the data are transferred from a selected source register to a selected destination register it is shifted for a 1 bit rotation so that data appearing in the first position of the selected source register appears in the 30th position of the selected destination register and all other data are shifted left one position. For a 6 bit rotation data in the 1st position of the selected source register appears in the 25th position of the selected destination register; data in the 2nd position of the selected source register appears in the 26th position of the selected destination register. Thus the data is shifted in a closed loop-fashion, data appearing in the 1st position in the source register appearing in the 30th, 25th or 16th position of the destination register depending upon whether a 1, 6 or 15 rotation is required. This operation will be made clearer below.

The bits 11 and 12 are used to control the transfer logic circuits 11 in FIG. 1. Transfer logic connections provided in the computer to be described make possible copying, via the rotation control; an inclusive OR operation, in which the 1 bits of the source are copied; an AND operation, in which the 0 bits of the source are copied, and a negation operation, in which the complement of the source is copied. These three logical operations, and the ability to copy directly, when combined with the rotation capability provide a necessary and sufficient set of operations so that the computer can perform all general purpose computational functions. Other sets of logical operations might be used but it is necessary that the set chosen be sufficient for general purpose computation. Again, this function will be made clearer when the physical circuits performing it are described.

Bit 13 in the instruction register is an index bit. When present, or logic 1, it is used to perform the operation of incrementing the contents of a selected member by 1. When absent, or logic 0, this bit performs no function.

Bit 14 of the instruction register is an indirect address control, used in a manner to be described below.

Typical useful instructions are given in Table I below. In Table I, the instruction is given in octal form for brevity. The instruction is written in the form in which it would appear in the instruction register as diagramed in FIG. 2; thus, the first instruction 63200 would appear as bits 0 through 14 in the instruction register in the form 110011010000000.

TABLE I

| Instruction | Explanation |
|---|---|
| 63200 | Copy (BR) into IC. |
| 62104 | OR (AR) into BR. |
| 21000 | Clear AR and add (A). |
| 21014 | Clear AR and subtract (A). |
| 36000 | Add to AR, extended range, (A[0–29]). |
| 36014 | Substract from AR, extended range, (A[0–29]). |
| 36000 | Add to AR, single range, (A[15–29]). |
| 36074 | Substract from AR, single range, (A[0–14]). |
| 20100 | Store (AR) in A. |
| 20114 | Store (AR) in A. |
| 20220 | Store (BR) in A, rotated 6 bits left. |
| 25000 | Evaluate the expression specified by the control word found in the addressed memory location. |
| 22242 | Rotate (BR) left 6 bits, and increment the contents of the addressed memory location. |
| 02160 | If (AR)=0, load AR from the addressed memory location. |
| 62000 | Load this instruction into BR. |
| 24102 | Execute the instruction found in AR, and increment the contents of the addressed memory location. |
| 04302 | If (AR[15–29])≠0, execute the instruction found in the addressed memory location, after incrementing its address field. |
| 75014 | Subtract the contents of address field in this instruction from (AR). |
| 23004 | Set ONE bits into IC from the constant found in the addressed memory location. |
| 40674 | Store the ONES complement of (S6), rotated left 15 bits, in the memory location following this instruction. |

If bits 0 and 1 in the instruction register are both 0, the equipment operates in mode M0 in which the instruction format of FIG. 3 is employed. In this mode, the instruction mode, destination, transfer, index and indirect addressing bits, as well as the address portion of the instruction, are interpreted in the same way as in FIG. 2. However, the bits 6 through 10 are interpreted as a special operation code, functioning in conjunction with the bits 0 and 1 to carry out one of a set of special instructions, some normally preselected and others made available for assignment from time to time as a particular application for the computer may make desirable.

The special instruction mode M0 is used for all conditional instructions and all instructions which change a location counter in the memory sub-system, to be described, other than by means of normal sequential addressing. A set of convenient operation codes for mode M0 and their meanings is given in Table II below:

TABLE II

| | |
|---|---|
| **C0** | Generate interrupt request. |
| **C1** | JPSR to A, (LC)→A, A+1→LC. |
| **C2** | JUMP to A, A→LC. |
| **C3** | If (AR)<0, JPSR to A. |
| **C4** | If (AR)<0, JUMP to A. |
| **C5** | If (AR[15–29])≠0, JPSR to A. |
| **C6** | If (AR[15–29])≠0, JUMP to A. |
| **C7** | If (AR)<0, SKIP next instruction, (LC)+1→LC. |
| **C8** | If (AR[15–29])≠0, SKIP. |
| **C9** | If A⊙(S4[0–14])≠0, SKIP. |
| **C10** | If A⊙(S4[15–29])≠0, SKIP. |
| **C11** | If (AR)<0, transfer (A) to destination. |
| **C12** | If (AR[15–29])≠0, transfer (A) to destination. |
| **C13–C31** | Generate interrupt requests. |

In general, the operation of the computer of FIG. 1 proceeds by the fetching of an instruction from the memory system DME, by way of the memory data register MD, and the loading of this instruction into the instruction register IR. The instruction is then executed while the instruction portion is held in the instruction register IR. The execution of the instruction may involve transfer from a selected source to a selected destination with intermediate logical transformations performed by the rotation control 9 and the transfer logic 11, as well as additional modifications which may be made in accordance with the instruction and modification of the instruction itself.

Before beginning a detailed description of the circuits shown in block diagram form in FIG. 1, certain conventions used in describing the apparatus of my invention will be explained. For convenience, and to simplify the drawings, return leads for circuits have not been shown, except in a few instances for expository convenience. Further, where a lead is connected to a number of elements, the lines joining the connecting terminals have been omitted, and the lead labelled with a distinguishing label. All leads bearing the same label may be assumed to be connected together. Digital signals are assumed to be represented by a positive potential with respect to ground for logic 1 and a negative potential with respect to ground for logic 0. It will be apparent to those skilled in the art that the circuits could equally well be designed to function with other potentials, or with a potential and an open circuit condition for the different logical truth values. As is known, in some instances it is required to insert amplifiers to restore current levels, or to duplicate circuits in parallel to prevent overloading. Since the necessity for expedients of this kind is obvious from ordinary design considerations in any particular instance, such circuits have not been shown.

(II) THE DIGITAL SYSTEM CONTROL UNIT

(A) Computer operation control circuits

Referring now to FIGS. 4*a* through 4*h*, a set of circuits present in the system control unit is shown for controlling the operation of the computer of my invention. These control circuits include two circuits frequently employed throughout the rest of the apparatus, and it should be understood that similarly depicted circuits in other figures may be of the same construction as those shown and described in connection with FIGS. 4*a* through 4*h*.

The first of these two circuits is a conventional NOR gate such as the gates 23 and 25 in FIGS. 4*g* and 4*h*, respectively. Such gates may be provided with any number of input terminals within practical limits, and may be of the conventional type having the property that an output logic 1 level is provided when and only when all of the input terminals are at the logic 0 potential. As illustrated by the gate 23, when only a single input terminal is provided, the circuit acts as a logical inverter. As illustrated by the gate 25, when the number of input terminals makes it convenient to do so, the symbol is extended without changing the size of the block representing the gate. As illustrated by the gates 23, 27, 29 and 31, interconnection of the output terminals of a set of gates may be utilized, and when so connected a logic 1 output terminal on any one of the gates will produce a logic 1 level on the interconnected terminals. A barred label, as in the label for the input of the gate 23, indicates that the lead is at logic 1 potential when the labelled condition is not present.

The second basic circuit is a conventional triggered flip-flop such as the flip-flops 33 and 35, shown in FIGS. 4*a* and 4*b*, respectively. These flip-flops may be of conventional design arranged to produce a logic 1 level at the 1 output terminal either in response to a logic 1 level applied to that terminal, or in response to a logic 1 level applied to a direct set terminal DS, or finally in response to a trigger pulse applied to an input trigger terminal T when a logic 1 level applied to a set gate input terminal SG has been present for a predetermined time. The flip-flops so constructed may be variously connected depending upon the logical conditions under which it is desired to set and reset them. The flip-flop 33 is adapted to be directly set by a reset switch having a normally open contact *a* and a normally closed contact *b*. The flip-flop 33 may also be set by a time delay relay TDR, energized when the computer is operating by closure of an "ON" switch on the operator's console. The relay holds the flip-flop 33 in the set state for a short time, such as five seconds, after the "ON" switch is closed, and then opens its contact *a* to allow the flip-flop to be reset. When momentarily depressed, the reset switch applies a positive potential to set the flip-flop 33, and the flip-flop is reset when the switch is released. This action produces a pulse SMR for resetting the entire system to a reference state.

The "reset," "pause," "cycle," "step," "run" and "halt" switches shown in FIGURE 4 are provided on the computer operating console for use by the computer operator.

The flip-flop 35 is set by momentary closure of a contact *a* of the "pause" switch to produce a level PSE. As will appear, when this level is present, the system operates in a mode in which no instructions are fetched from memory under program control, but in which the program interrupt sub-system may function at any time. The flip-flop 35 is adapted to be reset by momentary closure of either the "halt" switch of the "run" switch, to be described. The flip-flop 35, as is the case of most of the other flip-flops to be described, is adapted to be reset by the pulse SMR applied to its direct reset terminal DR. This function will not be described for each flip-flop so connected, but should be understood to be provided for where indicated in the drawings by a lead labelled SMR connected to the direct reset terminal DR of the flip-flop.

As is shown in FIG. 4*c*, a flip-flop 37 is provided to establish a "cycle" mode of operation. This mode is established by momentary closure of a "cycle" switch, temporarily closing a contact *a* to set the flip-flop 37 and opening a contact *b* to permit the setting to take place, and thereafter reversing the state of the flip-flop when the switch is released. In the "cycle" mode of operation, one machine cycle will take place, and a "halt" state will then be established.

The "halt" mode of operation is established by a flip-flop 39, shown in FIG. 4*d*, or by a level ESTP produced in a manner to be described, the "halt" state may also be established by the pulse SMR, which sets the flip-flop 39 to the "halt" state when the reset switch is closed. The flip-flop 39 is reset either when the "run" switch, to be described, is actuated, or when the "pause" switch is actuated.

A flip-flop 41, shown in FIG. 4*e*, is provided to produce a STEP level to direct the computer to cause one instruction to be fetched, modified and executed, after which the "halt" state is resumed. A "step" switch is provided with a normally open contact *a* and a normally closed contact *b*, such that actuation of the switch causes the flip-flop 41 to be alternately set and then reset.

Referring to FIG. 4*f*, flip-flop 43 is provided to establish the "run" mode of operation of the computer. This flip-flop is set by momentarily closing a "run" switch having a contact *a* which sets the flip-flop 43. The flip-flop 43 may be reset by momentary closure of either the "halt" switch or the "pause" switch.

Referring now to FIG. 4*g*, a chain of operations is caused to occur when the computer is set to the "run," "step," "cycle" or "pause" states. When the computer enters any of these states, one of the gates 23, 27, 29 and 31 will have a logic 0 at its input terminal. Under these conditions, the level $R+S+C+P$ is produced (to be read, "RUN or STEP or CYCLE or PAUSE"). When this level is not present, a logic 1 level is applied to the set gate input terminal of a flip-flop 45. Thereafter, at the leading edge of the logic 1 level produced when the computer enters one of the states, "run," "step," "cycle" or "pause," the flip-flop 45 is triggered and set to its set state. At this time the level ESTRT is produced.

The level ESTRT is applied to one input terminal of a two-input NOR gate 46. The other input terminal receives a pulse CLI, produced in a manner to be described and constituting one of a pair of oppositely-phased system clock pulses. The output terminal of the gate 46 is connected over one path to one input terminal of a two-input gate 48, the other input terminal of which receives the opposite clock pulse $\overline{\text{CLI}}$. With these connections, the signal for resetting the flip-flop 45 will be produced at the CLI time after the flip-flop 47 is set.

The output signal from the gate 46 is also used to reset the flip-flop 47. The flip-flop 47 is set by a gate 49. The gate 49 receives the clock pulse CLI and the level $\overline{\text{ESTRT}}$. It will thus produce a logic 1 output signal for setting the flip-flop 47 when CLI is not present and the flip-flop 45 is in its set state. The flip-flop 47 produces a level STRT for the duration of one CLI cycle while the flip-flop 45 is set. This pulse is used to start system operation.

Referring now to FIG. 4*h*, flip-flop 51 is provided to produce the level ESTP to set the flip-flop 39 to the "halt" state after the fetching, modification and execution of one instruction in the "step" state. For this purpose, the set gate input terminal SG of the flip-flop 51 is connected to receive the level STEP, and the trigger input terminal T receives a level $\overline{\text{EXC}}$, produced in a manner to be described when the computer is not in the execute mode of operation. Thus, when the "step" flip-flop 41 is set, at the the execution cycle of the machine, to be described, a positive-going transition is produced on the lead $\overline{\text{EXC}}$, and the flip-flop 51 is set. The flip-flop 51 may be reset by a gate 53. The gate 53 is connected to receive a timing signal *t*9 and a level $\overline{\text{STOP}}$. The gate 53 will accordingly produce a positive signal to reset the flip-flop 51 at the time *t*9 when the "stop" state is established.

The "stop" state is established by the flip-flop 55. This flip-flop is arranged to be directly set by the pulse SMR, and to be set at a time *t*8, determined as described below, by either of two gates 25 and 57. The gate 25 sets the flip-flop 55 when the computer is not executing an instruction nor fetching an internal or external instruction, and is in the "halt" mode. For this purpose, the gate 25 receives the level $\overline{\text{HALT}}$, FI, FPI and EXC. The gate 57 sets the flip-flop 55 when the computer is executing an instruction in the "halt" mode. For this purpose, the gate 57 receives the levels $\overline{\text{EXC}}$ and $\overline{\text{HALT}}$.

The flip-flop 55 is also arranged to be directly set by a gate 59. This gate operates to set the flip-flop 55 when the flip-flop 51 is set.

The flip-flop 55 may be reset when the computer first goes to the "run," "pause" or "step" states. To accomplish this purpose, three gates 61, 63 and 65 have their output terminals connected together, and each serves to invert one of the levels $\overline{\text{RUN}}$, $\overline{\text{PSE}}$ and $\overline{\text{STEP}}$. When one of the output terminals goes positive, a pulse is produced by a suitable pulse forming network, here shown as a capacitor 67, a resistor 69, and an isolating diode 71.

(B) Computer cycle and timing circuits

Referring now to FIG. 5, the machine cycle counter and timing circuits for the computer of FIG. 1 will next be described. The basic timing signals for the computer are derived from a conventional two-phase clock oscillator 73 of suitable frequency. In one practical embodiment, I have employed an oscillator having a frequency of two megacycles per second. The outputs of the oscillator 73, connected through conventional drive amplifiers 75 and 76, alternately produce the clock pulses CLI and $\overline{\text{CLI}}$ employed elsewhere in the system. These pulses are used to derive a chain of basic timing pulses by means of a set of timing flip-flops TF1 through TF10.

Each of the flip-flops TF1 through TF10 may be of the same construction illustrated for the typical flip-flop TF1. The flip-flop TF1 comprises a conventional flip-flop 77 of the type described above. It is adapted to be either set or reset by inputs applied to its output terminals 1 and 0, respectively. The flip-flop TF1 is set to produce the timing pulse A by an output signal produced by either of two gates 79 and 81. The gate 79 produces a setting pulse when the flip-flop 47 in FIG. 4 produces the level STRT and the pulse CLI is present with the level MC1 absent. The level MC1 is a cycle duration control signal produced in a manner to be described. When present, this signal MC1 directs a one microsecond machine cycle, and when absent one of two longer cycles are employed.

The gate 81 produces a setting pulse for the flip-flop TF1 when a level EX is produced by the setting of the flip-flop TF10, the level MC1 is absent, the pulse CLI is present, and the flip-flop 55 in FIG. 4 is not set to produce the STOP level.

The flip-flop TF1 is reset by a gate 83 when the pulse CLI is present, the level MC1 is absent, and neither the flip-flop TF10 is set nor the pulse STRT is present.

The flip-flop TF2 is set to produce the timing signal AX by a gate 85 when the flip-flop TF1 is set and the pulse CLI is absent. The flip-flop TF2 is reset by a gate 87 when the flip-flop TF1 is reset and the pulse CLI is absent.

The flip-flop TF3 is set to produce the timing signal B by a gate 89. This gate is effective to set the flip-flop TF3 when the flip-flop TF2 is set and the pulse CLI is present. The flip-flop TF3 is reset by a gate 91 when the flip-flop TF2 is reset and the pulse CLI is present.

The flip-flop TF4 is controlled by a pair of gates 93 and 95 exactly as for the flip-flop TF2 except that it is controlled by the flip-flop TF3 instead of by the flip-flop TF1. This flip-flop TF4 produces the timing pulse BX.

The flip-flop TF5 produces the timing pulse C in a manner determined by the controlling gates 97 and 99. These gates are the same as the gates for the flip-flop TF3, except that each includes an additional terminal to which a signal MC2 is applied. This signal is positive when a two microsecond machine cycle is selected by the cycle control circuits, to be described.

The flip-flop TF6 is controlled by the flip-flop TF5 by means of gates 101 and 103, connected in the same manner as for the flip-flop TF4 except that the flip-flop TF6 is controlled by the flip-flop TF5 instead of the flip-flop TF3. The flip-flop TF6 will produce a timing pulse CX at the time $\overline{\text{CLI}}$ after the flip-flop TF5 has been set at the time CLI.

The flip-flop TF7 is arranged to produce the timing pulse D at a time selected in dependence on the machine cycle length control circuits to be described in connection with FIG. 6. When the machine cycle MC1 is selected, and the start pulse STRT is produced, the flip-flop TF7 is set at CLI time by a gate 105. During normal running of the machine with the level MC1 present, the flip-flop TF7 is set by a gate 107 receiving the signals $\overline{\text{EX}}$, $\overline{\text{MC1}}$, STOP and $\overline{\text{CLI}}$. A gate 109 is provided to reset the flip-flop TF7 at the time CLI when the machine cycle MC1 is selected and neither the start pulse STRT is present nor the pulse EX produced by the setting of the flip-flop TF10 is present.

When the machine cycle MC2 is selected, the flip-flop TF7 is set by a gate 111 and reset by a gate 113. The flip-flop TF7 is set to produce the timing pulse D at CLI time following the setting of the flip-flop TF4 at $\overline{\text{CLI}}$ time. Resetting is accomplished by the gate 113 after the flip-flop TF4 has been reset.

When the machine cycle MC3 is selected, the flip-flop TF7 is set and reset by the gates 115 and 117, respectively.

The flip-flops TF8 and TF10 are set and reset by associated gates 119, 121, 123 and 125 in the same manner as the flip-flop TF6, and the flip-flop TF10 is controlled by the flip-flop TF9. The flip-flop TF9 is controlled by the flip-flop TF8 by means of gates 127 and 129 in the same manner as the flip-flop TF3 is controlled by the flip-flop TF2.

As shown in FIG. 5, the level EX produced by the flip-flop TF10 is applied, together with the start pulse STRT, to a gate 131. The output of this gate is inverted by a gate 133, to produce the signal STRT+EX, read "START or EX," applied as described above to the input terminal of the gate 83.

A series of timing pulses *t*0, *t*3, *t*6, *t*8 and *t*9 are produced in dependence on the CLI and timing pulses described above. These timing pulses are numbered in accordance with their occurrence with respect to an ordered sequence of CLI pulses. The signals *t*0 and $\overline{t0}$ are produced by a pair of gates 135 and 137. The gate 135 receives the signals $\overline{\text{A}}$ and CLI, to produce a pulse *t*0 when CLI is absent and the flip-flop TF1 is set. Pulses *t*3 and $\overline{t3}$ are similarly produced by a pair of gates 139 and 141, the pulse *t*3 being produced when the flip-flop TF4 is set and CLI is present. The pulse *t*6 is produced, when the flip-flop TF7 is set and CLI is absent, by a gate 143. A gate 145 used as an inverter produces the level $\overline{t6}$. The gate 147 produces the pulse *t*8 when the flip-flop TF9 is set and CLI is absent. An inverter 149 produces a signal $\overline{t8}$. The gate 151 produces the timing pulse *t*9 when the flip-flop TF10 is set and CLI is present. An inverter 153 produces a timing pulse $\overline{t9}$.

The signals $\overline{t0}$ and $\overline{t3}$ are employed to control a flip-flop 134. For this purpose, the signal $\overline{t0}$ is applied to a gate 136 to cause the flip-flop 134 to be set at *t*0, producing the level HMP. The signal $\overline{t3}$ is applied to a gate 138, resetting the flip-flop at *t*3.

(C) Machine cycle duration control circuits

Referring now to FIG. 6, I have shown the circuits for determining the machine cycle duration. While various durations may be selected, in one practical embodiment of my invention the machine cycle MC1 was one microsecond in duration, MC2 was two microseconds in duration, and MC3 was 2.5 microseconds in duration. The cycle length MC2 is that most frequently used, and the signal selecting that length is accordingly produced by a gate 155 which receives the levels MC1 and MC3. Thus, when neither MC1 nor MC3 is selected, MC2 will be automatically selected. An inverter 157 is employed to produce the level $\overline{MC2}$ for use where desired.

The machine cycle MC1 is produced when it is desired to fetch a priority instruction, as indicated by the level $\overline{FPI}$ connected to the input of the gate 159, under certain conditions when an instruction contains the instruction mode code M3, or under other conditions when the instruction contains the instruction mode code M0 and operation codes C2, C4 or C6 are present. As shown, the signals $\overline{EXC}$, I1, and PIED are applied to the input terminals of a gate 161. The output terminal of this gate is connected through an inverter 163 to a gate 165 that also receives the level $\overline{M3}$. The gate 165 will accordingly produce an output logic 1 level MC1 when M3 is present, the machine is in the execute portion of the cycle, no indirect addressing command is in the instruction, and the priority execution delay level PIED is not present. The latter level is produced by the program interrupt subsystem, in a manner to be described below.

The conditions under which the gate 161 produces a positive output potential also enable a set of gates 167, 169 and 171 by means of an intermediate inverter 173. These gates 167, 169 and 171 accordingly produce the level MC1 when any of the operation codes C2, C4 or C6 is present, the machine is in the "execute" portion of an operating cycle, indirect addressing is not to occur, and the PIED level is absent. A further condition is imposed by a gate 175, which receives a level $\overline{XI}$ to inhibit the operation of the gates 167, 169 and 171 when an index bit is present in the instruction. As shown, the level $\overline{MC1}$ is produced by a gate 177 used as an inverter.

The machine cycle control signal MC3 may be produced by any one of five gates 179, 181, 183, 185 and 187. These gates each have three input terminals, and one terminal of each gate receives the level $\overline{EXC}$. The gates 179 and 181 also receive the index absent level $\overline{XI}$. The gate 179 also receives the level M3, and the gate 181 receives the level $\overline{I1}$. The gates 183, 185 and 187 receive the level I1, and each receives a different one of the operation code signals $\overline{C1}$, $\overline{C3}$ and $\overline{C5}$. Gates 179 and 181 select the longest machine cycle MC3 to encompass the longest memory cycle required for indexing. The operation codes C1, C3 and C5 would be those assigned to special instructions that also require longer cycles. As shown, an inverter 191 is provided to produce the level $\overline{MC3}$.

In FIG. 7, I have shown control circuits for a flip-flop 193 employed to direct the loading of the instruction register. This flip-flop is arranged to be set at the leading edge of the pulse *t*8 when a set gate level has been stored by operation of one of a set of gates 195, 197, 199, 201 and 203. The flip-flop 193 is directly reset by the operation of one of two gates 205 and 207.

The gate 195 illustrates an example of the use of the destination code to effect operations other than the direct transfer to a destination. This gate receives the levels $\overline{EXC}$, M0, $\overline{D4}$ and I1. In the execute mode of operation, when D4 is selected, the instruction is not a special instruction requiring a different interpretation, and the indirect address bit I1 is absent, the gate 195 will produce a pulse to set the flip-flop 193 to produce the level LIR, meaning "load instruction register." This is arranged to occur at time *t*8; the desired information is placed in the memory data register MD at the preceding time *t*6. The gates 197 and 199 are provided to permit the loading of the instruction register when special instructions are present including the operation codes C11 and C12. Further conditions required are that special program branch conditions B1 or B2 are met. These special operation codes and branch conditions will be described below.

The gates 201 and 203 are provided to permit the loading of the instruction register during the fetching of an instruction, either from the memory sub-system DME or from the external instruction busses under the control of the program interrupt system. For this purpose, the gate 201 receives the level $\overline{FI}$, and the gate 203 receives the level $\overline{FPI}$.

Depending upon the machine cycle duration selected, the pulse *t*0 may or may not be produced during the machine cycle. Accordingly, the flip-flop 193 is arranged to be reset either at *t*0 by a gate 205, or at *t*6 by a gate 207. The pulse *t*0 marks the beginning of the two longer machine cycles, whereas *t*6 marks the beginning of the shortest machine cycle MC1.

The index and indirect address bits of the instruction register are loaded when the instruction register is loaded, and may also be loaded at other times when the indirect addressing bit is present. These bits are loaded under the control of a flip-flop 209. This flip-flop is set at time *t*8 by means of a gate 211 when an indirect address bit I1 is in the instruction register and the machine is in the EXC state. Loading of bits 13 and 14 into the instruction register is directed by a level TXI, produced by a gate 213 when either the load instruction register signal LIR is present or the flip-flop 209 is set. Just as for the flip-flop 193, the flip-flop 209 is arranged to be reset either at time *t*0 or time *t*6, by means of gates 215 and 217.

(D) Memory control circuits

FIGS. 9*a*, 9*b* and 9*c* show circuits for determining the type of memory cycle to be employed in a data transaction with the digital core memory sub-system DME. Referring first to FIG. 9*a*, a "sequential" addressing cycle is established by a gate 219 when a logic 1 signal is applied to any of its three input terminals. A first set of seven gates, 221, 223, 225, 227, 229, 231 and 233 is provided for at times providing a logic 1 input signal to the gate 219. A SEQ signal may be produced either during the fetching of an instruction, or during the execution portion of an operating cycle. When it is desired to fetch an instruction, the gate 221 produces an output positive potential in response to the level FI from *t*0 to *t*3 when the level HMP is present. During the execution portion of the cycle, one of the gates 223, 225, 227, 229, 231 and 233 may be rendered effective to produce a SEQ signal. Each of these gates receives the timing signal HMP so that any pulse produced will extend from the time *t*0 to the time *t*3. Each of these gates also receives the levels $\overline{EXC}$ and I1. The first of these levels ensures that any pulse produced shall be during the execution portion of the cycle, and the second that the pulse should not be produced if an "indirect addressing" bit is in the instruction register.

The gates 223 and 225 receive the signal $\overline{M2}$, signifying that the instruction mode in the instruction register is M2. The gate 223 further receives a level $\overline{S0}$, so that it is effective if the source selected is the memory data register. The gate 225 receives a level D4, so that it will be effective if the other conditions are present and the destination selected is not the instruction register.

The gates 227, 229, 231 and 233 are effective during special instruction execution. The gate 227 will produce an output logic signal if the other terminals are at the proper potential, the operation code is C7, and the program branch condition B1 is met. The gate 229 is similarly responsive if the operation code in the special instruction is C8 and the program branch condition B2 is met. The gate 231 is effective if the operation code is C9 and the branch condition B3 is met. The gate 233 is effective if the operation code is C10 and the branch condition B4 is met.

In FIG. 9*b*, I have shown a circuit for establishing a "random addressing" mode of operation. This condition is established when the signal labelled $\overline{\text{RAND}}$ is absent. That occurs when the output terminals of both of a pair of gates 235 and 237 are at logic 0. The gate 235 receives the timing signal HMP, so that if generated the signal RAND occurs during the time from *t0* to *t3*. The gate 237 may be actuated to produce a logic 0 signal at its output terminal by a logic 1 signal applied to its input terminal from any of five gates 239, 241, 243, 245 and 247. Each of these gates has an input terminal connected to receive the level $\overline{\text{EXC}}$, so that they are effective only during the execution portion of the operation cycle. The gate 239 is effective when the instruction mode code is M1 and the source is S0. The gate 241 is effective when the indirect addressing bit I1 is in the instruction register. The gate 243 is effective when an instruction load code is M1 and the destination is not the instruction register. The gate 245 is effective when a special instruction contains the operation code C11 and the program branch condition B1 is met. The gate 247 is effective when a special instruction contains the operation code C12 and the program branch condition B2 is met.

FIG. 9*c* shows a circuit for establishing a "random reset" mode of operation. This mode is established when a level labelled $\overline{\text{RAR}}$ is absent from the output terminal of a gate 249. This gate has its input terminal connected to the output terminals of three gates 251, 253 and 255. Each of these gates receives the levels $\overline{\text{EXC}}$, I1 and $\overline{t0}$. The gate 251 is effective when a special instruction is present containing the operation code C1. The gate 253 responds when the operating gate is C3 and the branch condition B1 is met. The gate 255 responds when the operation code is C5 and the branch condition B2 is met.

FIGS. 10*a*, 10*b* and 10*c* show circuits for controlling the exchange of data with the cores of the memory subsystem DME. Referring first to FIG. 10*a*, a "clear-write" operation is directed by a level CLW produced at the output terminal of a gate 257 when a memory data load signal $\overline{\text{MDL}}$ is absent at the input terminal of the gate 257, or when the output terminal of a gate 259 is at a positive potential. The latter condition will occur in the execution portion of an operating cycle when the indirect addressing bit I1 is absent, the instruction mode is not M0, and the destination is D0 (the memory data register). A complementary level $\overline{\text{CLW}}$ is produced by a gate 261 as shown.

Referring now to FIG. 10*b*, a circuit for establishing a "read-restore" mode of operation is shown. The circuit comprises a gate 263 producing a level $\overline{\text{RER}}$, which is absent to produce the "read-restore" cycle when the "fetch instruction" signal FI is present or when either of the output terminals of a pair of gates 265 and 267 is at a positive potential. Both the gates 265 and 267 have input terminals receiving the levels $\overline{\text{EXC}}$ and X1. The gate 265 is effective when the indirect addressing bit I1 is present in the instruction register. The gate 267 is effective when the indirect addressing bit is not present and when in addition to other conditions the selected source is S0 or the destination is not D4 and the destination is not D0 or the instruction load code is M0.

Referring now to FIG. 10*c*, I have shown a circuit for establishing a "read-index-store" mode of operation. A gate 269 produces an output signal labelled $\overline{\text{RIS}}$, which is absent to establish the "read-index-store" mode of operation when a positive potential is applied to the input terminal of the gate 269. This positive potential may be produced by either of two gates 271 and 273. These gates are in a sense complementary to the gates 265 and 267 in FIG. 10*b*, in that they are effective when the index bit X1 is present in the instruction register. Both gates receive a signal $\overline{\text{X1}}$ and a signal $\overline{\text{EXC}}$. In addition, the gate 271 receives the signal $\overline{\text{I1}}$, whereas the gate 273 receives the additional signals $(\overline{\text{S0}}+\overline{\text{D4}})$, $(\overline{\text{D0}}+\text{MO})$ and I1.

Referring next to FIGS. 11*a* and 11*b*, I have shown circuits for controlling the memory data register MD. Referring first to FIG. 11*a*, a memory data loading signal MDL is produced when the output terminals of both of a pair of gates 275 and 277 are at logic 0 potentials. The gate 277 is in this condition at the time *t6*. The gate 275 may be operated either by the "fetch" priority instruction signal FPI, or by a gate 279 producing an output potential in response to the absence of the signals $\overline{\text{EXC}}$, M0, $\overline{\text{D4}}$, S0 and I1. The latter signals will all be absent during the execution portion of the cycle when the instruction mode code is not M0, indirect addressing is not in effect, and it is desired to load the instruction register from a source other than the memory data register by way of the memory data register.

Referring next to FIG. 11*b*, I have shown a circuit for producing a signal directing the loading of the location counter, to be described, in the data memory sub-system DME from the memory data register MD. This operation is carried out when the signal MDLC is absent, a condition which occurs when logic 1 potentials are applied to both of the input terminals of two one-input terminal gates 281 and 283. The gate 281 receives the timing signal *t6*. The gate 283 may be operated by a logic 1 potential applied from any of three gates 285, 287 and 289. Each of these gates receives the signals $\overline{\text{EXC}}$ and I1. The gate 285 further receives special instruction operation code signal $\overline{\text{C2}}$. The gate 287 receives the operation code $\overline{\text{C4}}$ and the program branch condition signal $\overline{\text{B1}}$. The gate 289 receives the operation code $\overline{\text{C6}}$ signal and the program branch condition $\overline{\text{B2}}$ signal.

FIG. 12 shows a group of circuits for controlling the fetching of instructions and the transfer of information in the computer of my invention. The fetching of an instruction under normal conditions is controlled by a flip-flop 263. This flip-flop is arranged to be set at the time *t8*, producing a signal FI, when an output positive potential from one of a pair of gates 265 and 267 has been stored at the set gate input terminal SG of the flip-flop 263. The gate 267 produces an output positive potential during the execution portion of an operating cycle if the indirect addressing bit is absent from the instruction, the destination is not D4, the "interrupt necessary" signal INN has not been produced by the program interrupt system, and the "pause" mode of operation is not in effect. The gate 265 will produce an output ground potential when the output terminal of a gate 268 is at logic 0 and none of the signals EXC, FI and FPI are present. The gate 268 will produce an output 0 potential in any of the machine states "run," "step" or "cycle."

As shown, the flip-flop 263 is arranged to be reset at the next *t8* pulse occurring after it has been set.

The execution cycle of the machine is established by a flip-flop 269. This flip-flop is arranged to be set at time *t8* when positive signals have been stored at the set gate termial SG by either a previous "fetch instruction" signal or by a "fetch priority instruction" signal FPI. For this purpose, two gates 271 and 273 have their output terminals connected to the set gate input terminal SG; the gate 271 receives the signal $\overline{\text{FI}}$, and the gate 273 receives the signal $\overline{\text{FPI}}$.

The flip-flop 269 is arranged to be reset at *t8* by a gate 275, which stores a reset gate signal when the flip-flop 269 has been set, the indirect addressing bit is not present, and the destination is not the instruction register. When this signal has been provided, the flip-flop is reset at the next occurring time *t8*.

The transfer from the selected source to the selected destination is controlled by a flip-flop 277. This flip-flop is arranged to be set at time *t*8 by a gate 279 previously storing a positive signal at its input terminal SG. The gate 279 receives the levels $\overline{EXC}$, D4 and I*i*. The flip-flop 277 will be reset at the next occurring *t*8 pulse after it is set. The logic 0 output terminal of the flip-flop 277 is connected to one input terminal of a two-input gate 281. The second input terminal is connected to the output terminal of a three-input gate 283. The input terminals of the gate 283 are connected to receive the signal $\overline{M0}$, and signals at the output terminals of two gates 285 and 287. The gate 285 receives the signals $\overline{C11}$ and $\overline{B1}$. The gate 287 receives the signals $\overline{C12}$ and $\overline{B2}$.

The output terminal of the gate 281 is connected through an inverting gate 289 to a terminal labelled $\overline{TRD}$. This terminal is also connected to the output terminal of a gate 291 that receives the timing signal *t*9. Transfer to destination will occur when the signal $\overline{TRD}$ is absent. That will occur during the execution cycle when the destination is not D4 and the indirect addressing bit is not present at the time *t*9 after the time *t*8 at which the flip-flop 277 is set, when the instruction mode code is not M0, or, if it is M0, when either the operation code is C11 and the branch program condition B1 is met, or the operation code is C12 and the branch program condition B2 is met.

A "delayed transfer" signal DTR is produced under certain conditions by either of two gates 293 and 295. The gate 293 produces the signal DTR when the program interrupt system is in use and the level PIED is present at *t*9 during the execution portion of a cycle with a signal TSD present. The gate 295 functions during the instruction fetching portion of an operating cycle, when the signals $\overline{FI}$, $\overline{TSD}$ and $\overline{T3}$ are absent. The level TSD is produced by a storage circuit comprising two gates 297 and 299 connected in front-to-back relationship, and set to produce the level TSD by a gate 301 to which the level $\overline{TRD}$ is applied. When the level $\overline{TSD}$ is absent, it can be restored either at *t*6 when the flip-flop 263 is set, by a gate 303, or, when the program interrupt system is operative and the signal $\overline{PIED}$ is absent, at time *t*0 when the flip-flop 269 is set during the execution portion of an operating cycle. The signal DTR is used in the accumulator AR to gate data from one register to the other after the loading of one of the registers in response to the signal TRD.

(E) Program branch condition detecting circuits

Figure 13A:
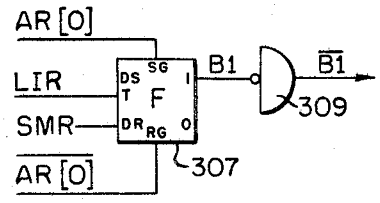

Referring next to FIGS. 13*a*, 13*b*, 13*c* and 13*d*, a set of circuits for detecting program branch conditions is shown. Referring first to FIG. 13*a*, a flip-flop 307 is arranged to be set when the signal LIR appears if the 0 bit in the accumulator source register is logic 1. This bit is used to detect the sign of the number stored in the accumulator; if present, it indicates that the number is negative, or less than 0. The flip-flop 307 will be reset, once set, upon the next occurring load instruction register signal LIR when the contents of the source register of the accumulator are greater than 0. The gate 309 is provided to produce the level $\overline{B1}$, for use as in FIG. 11*b*.

Figure 13B:
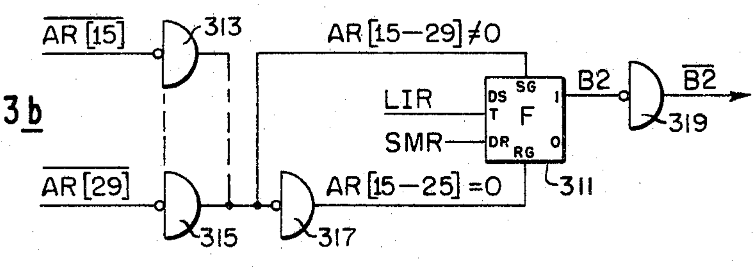

FIG. 13*b* shows a circuit for detecting the condition that the contents of bits 15 through 29 of the source register of the accumulator AR are not equal to 0. For this purpose, a flip-flop 311 is provided which is arranged to be set when the instruction register loading signal LIR is produced if the contents of bits 15 through 29 of the accumulator source register are not equal to 0 as detected by a set of gates such as 313 and 315 which are connected to detect the contents of the accumulator register. A gate such as 317 inverts this signal to provide for resetting of the flip-flop 311 when the load instruction register signal next appears and the contents of the accumulator source register is 0. A gate 319 is provided to invert the signal B2 to provide a signal $\overline{B2}$ for use in other circuits. The resetting of the flip-flop 311 may also be accomplished by the system reset pulse SMR, as indicated in FIG. 13*b*.

Figure 13C:
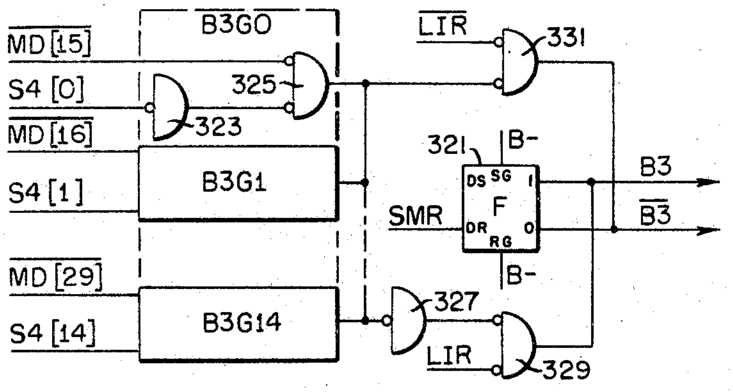

Referring now to FIG. 13*c*, a circuit is shown for producing the signal B3 when a bit-by-bit comparison of the sense lines 0 through 14 and the memory data locations 15 through 29 finds at least one pair of corresponding bits both 1. A flip-flop 321 is set when that condition is detected and the instruction load register signal LIR is present. The comparison is made by a set of 15 gates sets B3G0 through B3G14, each of which comprises a pair of gates such as the gates 323 and 325 in the gate set B3G0. The gate 325 receives the levels $\overline{MD(15)}$ and the output of a gate 323 to which the sense line S4 bit 0 is connected. The gate 325 will therefore produce an output positive signal when both the sense line bit 0 and the memory data register bit 15 are one. Similar comparisons are made by the other gates, and if any of them produces an output positive signal, a gate 327 will produce an output 0 signal. In the presence of the "load instruction register" signal LIR, a gate 329 will then set the flip-flop 321. When the "load instruction register" signal is present, and the comparison does not produce setting of the flip-flop 321, a gate 331 will reset the flip-flop 321. This branch condition is used with an instruction having an address field filled in a predetermined manner, as with all 1's, so that the production of the signal B3 will have a definite relation to the information on the sense lines.

Figure 13D:
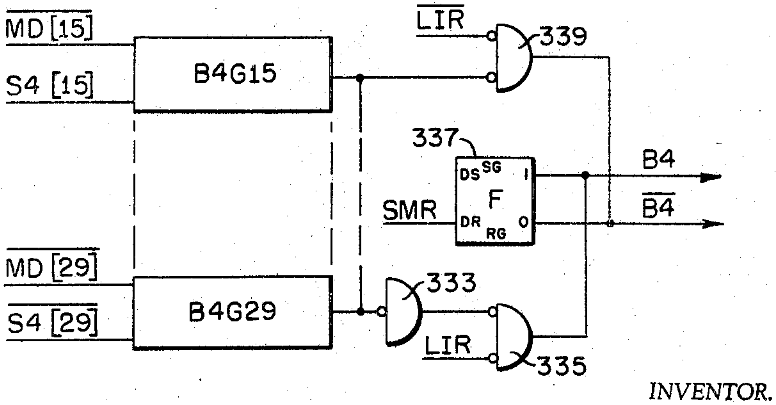

Referring now to FIG. 13*d*, a circuit is shown for producing a level B4 when comparison of the sense line bits 15 through 29 with the bits 15 through 29 of the memory data register MD finds at least one pair of corresponding bits logic 1. This comparison is made by a set of gates B4G15 through B4G29, which may be of the same construction as the similarly designated gates in FIG. 13*c*. When any pair of compared bits are both 1, a gate 333 will apply a logic 0 signal to one input terminal of a gate 335, the other input terminal of which receives the signal $\overline{LIR}$. The gate 335 will set a flip-flop 337 when the detected condition occurs during loading of the instruction register. When the detected condition does not occur, a gate 339 will reset the flip-flop 337 with the "load instruction" signal present. As described for the condition B3, the condition B4 is used with a predetermined address in the address field of the instruction, stored in MD [15]–[29].

(III) INSTRUCTION REGISTER

FIG. 14 shows the instruction register IR and associated decoding circuits. FIG. 14*a* shows the instruction register itself. This register comprises 15 flip-flops and associated gates for storing the bits 0 through 14 of an instruction. The units for storing each of the bits may be the same, and may be as shown for the section IR0. As shown, this section comprises a flip-flop 341 arranged to be set by a gate 343 when the signal $\overline{LIR}$ is absent and when a gate 345 produces an output 0 signal in response to a 1 in the 0 bit of the memory data register. A gate 347 resets the flip-flop 341 when the level $\overline{LIR}$ is absent and there is a 0 in the 0 bit position of the memory data register. Bits 13 and 14 are treated differently, in that they are loaded under the control of the signal TXI.

Figure 14A:
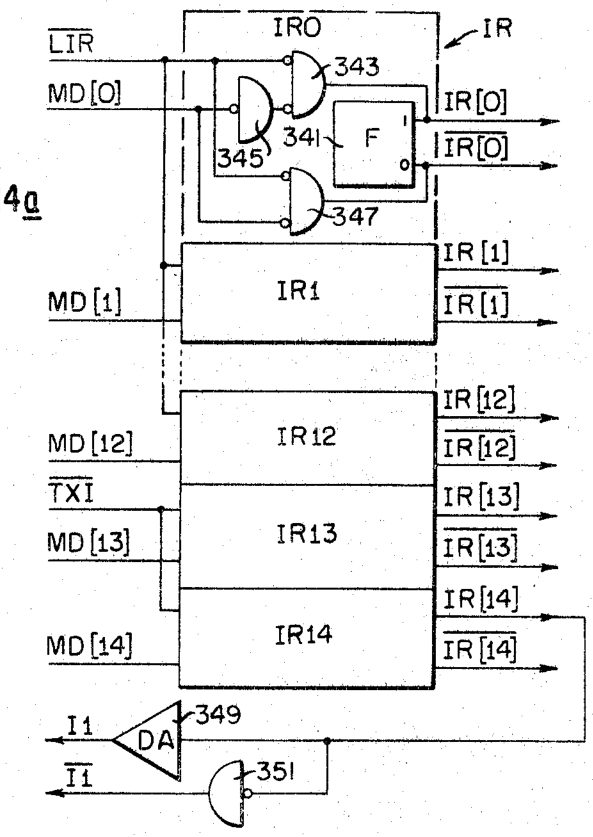
Figure 14B:
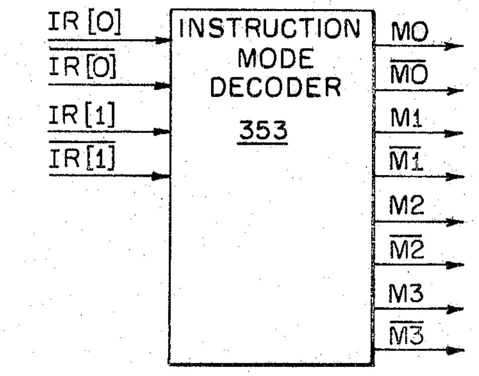

FIG. 14*b* shows the instruction mode decoder. This may be a decoder of any conventional design for responding to the bits 0 and 1 in the instruction register to produce a signal indicating the instruction mode and will not be described in detail.

Figure 14C:
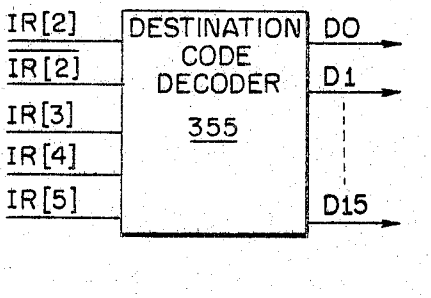

FIG. 14*c* shows the destination code decoder, which, like the instruction mode decoder, may also be of any conventional design.

Figures 14D, 14E, 14F:
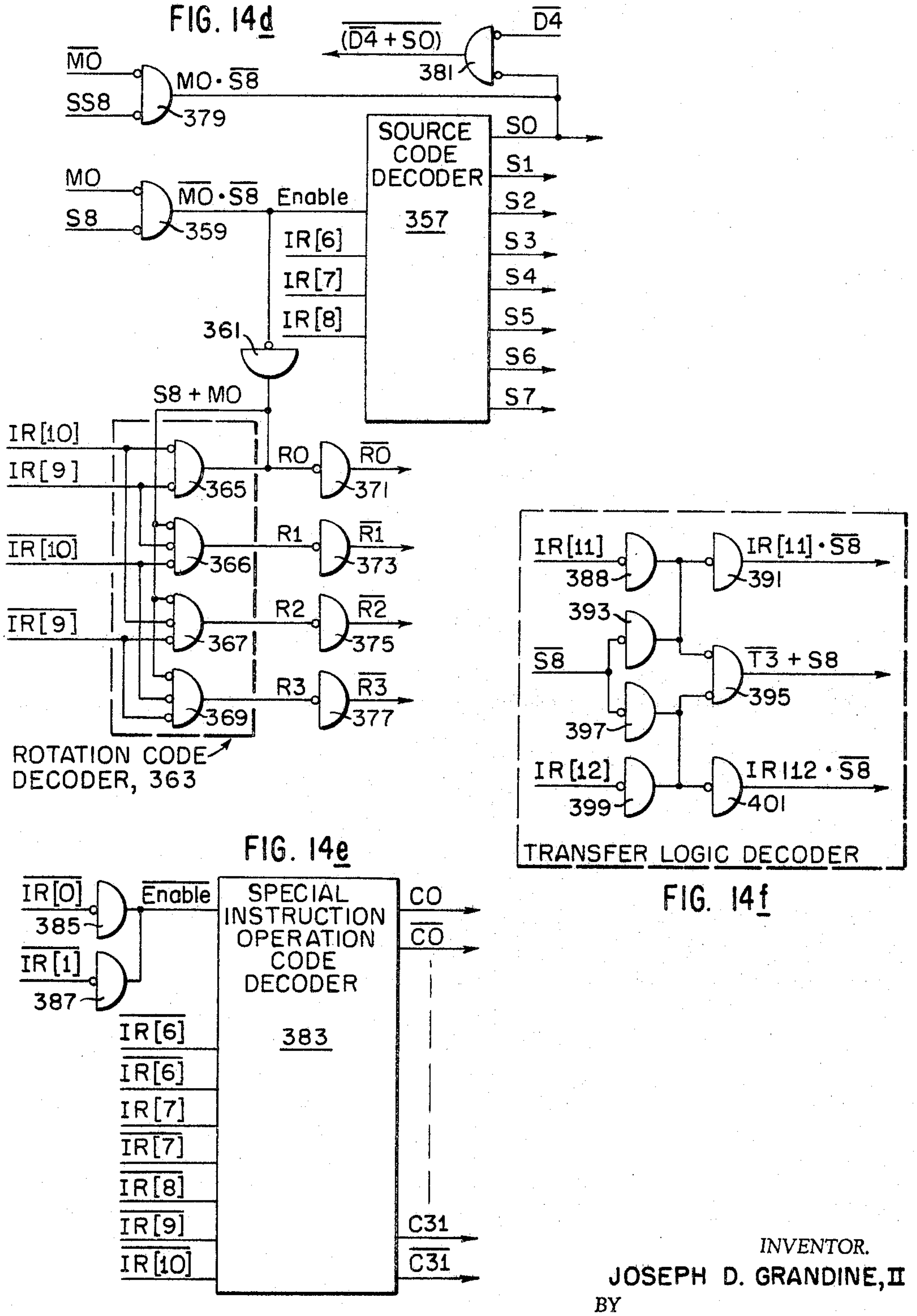

FIG. 14*d* shows the source code decoder and the rotation code decoder. The source code decoder may be a conventional decoder, provided with means for enabling decoding only when a special instruction is not present, as indicated by the signal $\overline{M0}$, and the program interrupt system is not fetching an instruction as indicated by the signal $\overline{S8}$. For this purpose, the levels M0 and S8 are supplied to a gate 359 to produce a positive enabling signal when both inputs are absent.

A gate 361 inverts the ENABLE level to produce a signal disabling the rotation code decoder 363. The decoder may be of any conventional design, but as here shown comprises 4 gates. These gates receive the different combinations of the signals IR[10], $\overline{IR[10]}$, IR[9] and $\overline{IR[9]}$ to produce one of the rotation codes R0, R1, R2 or R3. When either S8 or M0 is present, the decoder 363 is jammed to the R0 state. Gates 371, 373, 375 and 377 are provided to generate the complements of the rotation code signals.

A gate 379 is provided to jam the source code decoder 357 to S0 when special instruction mode code M0 is present and the program interrupt signal SS8 is absent. A gate 381 produces the signal ($\overline{D4}$+S0) for use elsewhere in the system when the source signal S0 is absent and the signal D4 is present.

FIG. 14*e* shows the special instruction operation code decoder. This decoder may be of any conventional construction, such as the construction shown for the rotation code decoder, with appropriate connections, and decodes the bits 6 through 10 in the instruction register when enabled by both of a pair of gates 385 and 387. These gates receive the signals $\overline{IR[0]}$ and $\overline{IR[1]}$, so that the decoder 383 is enabled only when the special instruction mode level M0 is present. Outputs are 32 special instruction operation code signals C0 through C31. These special instruction operation codes may be used for various purposes; typical preferred uses are given above.

FIG. 14*f* shows a transfer logic decoder. This decoder comprises a set of gates for producing three transfer logic signals IR[11]·$\overline{S8}$, $\overline{T3}$+S8, and IR[12]·$\overline{S8}$· in response to the state bits 11 and 12 of the instruction register and the $\overline{S8}$ signal indicating whether or not the program interrupt system is currently fetching an instruction from an external source. The signal $\overline{S8}$ is applied to the input terminals of two gates 393 and 397 having output terminals connected to both input terminals of a gate 395. The output terminal of the gate 393 is also connected to the input terminal of a gate 391. The output of the gate 397 is also connected to the input terminal of a gate 401. A gate 388 also has an output terminal connected to the input terminal of a gate 391 and a gate 399 has an output terminal connected to the input terminal of the gate 401.

(IV) DIGITAL DATA CHANNEL

FIG. 15*a* shows the digital data channel 1 of FIG. 1 in detail. As shown, in practice the source selector 3 comprises a set of source selection gates SSG0 through SSG29. Each may be of the construction shown for the gate set SSG0, comprising a gate 403 for each source in the system, including the external instruction busses S8. Each gate such as 403 receives a source selection signal such as $\overline{S0}$ and a bit from a bit position of the selected source such as the bit 0 of MD.

The 30 bits from the source selected by the source selection gates are transmitted to the rotation control gates 9 comprising a set of gate sets RCG0 through RCG29. Each of these gates may be of the construction shown for the gate set RCG0. As shown, each set comprises a gate for each possible rotation control state R0, R1, R2 or R3. A gate 405 receives the 0 bit transmitted by the source selection gates and the signal $\overline{R0}$. In the R0 state, the data is copied without rotation.

If a gate set including a first gate 407 is selected by the absence of the signal $\overline{R1}$, a 1 bit left rotation is initiated which is carried out by transmitting the corresponding 0 bit to the 29 bit position, as indicated by the lead 408. A corresponding shift is carried out by the gate RCG1 over the lead 411, placing the 1 bit in the 0 bit position. Other corresponding transfers are made in remaining gates so that the entire input set of bits is rotated left 1 bit position.

When R2 is present, the gate 413 is selected to provide a 6 bit left rotation. As indicated schematically by the brackets at the output of the gate 413, this results in the 0 bit being placed in the bit 24 position. The bit 29 position is placed in the bit 23 position, and so on. The 15 bit shift is produced when R3 is selected, by means of the gates such as 415. By this arrangement, either a 0, 1 bit left, 6 bit left or 15 bit left rotation may be accomplished.

Transfer logic control gates 11 are provided for each of the bit positions 0 through 29. The gates 11 comprise gate sets TCG0 through TCG29. These gates receive the signals from the rotation control gates, and in addition receive transfer control signals from the transfer logic decoder shown in FIG. 14*f*. The available tarnsfer logic transformation states shown are T0, in which the outputs of the rotation control gates are copied into the destination register, T1, in which only 1 bits are copied into the destination to produce an inclusive OR transformation, T2, in which only 0's are copied to produce a logical AND transformation into the destination register, and T3, in which the complement of the output of the rotation control gates is copied into the destination. When an instruction is to be copied from an external instruction source under the control of the program interrupt system, the signal S8 is present and direct copying is enforced.

The circuits will be described for bit 0 in connection with the detailed showing of the gate set TCG0. The contents of the 0 bit, which may be displaced by rotation as described above, appear on lead 417. This lead is positive if the corresponding bit is a logic 1. For the transfer state T0, which occurs either when both the bits 11 and 12 of the instruction register are 0 or when S8 is present, a "reset enable" bit is produced when the corresponding bit is a 1. The lead 417 is directly connected to the input terminals of a pair of gates 419 and 421, and is connected to input terminals of two gates 423 and 425 through an inverting gate 427.

When the signal $\overline{T3}$+S8 is present, the gates 423 and 421 are disabled and the gates 419 and 425 are enabled. Under these conditions, a reset enable signal is produced by the gate 419 if there is a 0 on lead 417, and a set enable signal is produced by the gate 425 if a 1 is present on the lead 417.

When the signal S8 is absent, the transfer is under the control of the bits 11 and 12 in the instruction register. If both bits are 1, the gates 419 and 421 are disabled. Under these conditions, the gate 423 will produce a reset enable signal if a logic 1 is on lead 417 and the gate 425 will produce a set enable signal if a logic 0 signal is on the lead 417.

When both bits 11 and 12 in the instruction register are 0, the gates 423 and 421 are disabled and the gates 419 and 425 are enabled to copy the information on the lead 417 into the selected destination register by producing a corresponding reset enable or set enable signal. If the bit IR[11] is a 1, the gate 425 is disabled and only reset enable outputs can be provided. Similarly, if the bit IR[12] is a 1, the gate 419 is disabled and only the gate 425 can function.

In practice, destination selection takes place under the control of a gating matrix including destination selection gates 13. These comprise a set of gates such as 431 for gating the transfer to destination signal $\overline{TRD}$ with the selected destination code. The outputs TRD1 through TRD15, with the exception of TRD4, are applied to enable the associated registers to receive the "set enable" or "reset enable" signals provided by the transfer logic control gates 11. In the system here shown, only destinations 0 through 9 are assigned, with the destination signals TRD13, TRD14 and TRD15 being connected to the destination register in the accumulator AR. The functions that would be performed by the signals TRD0 and TRD4 are carried out by the signals MDL and LIR, respectively.

The mode of connection of the "transfer-to-destination" signals and the set and reset enable signals to the associated register is illustrated in more detail in FIG. 15*b* (sheet 14) in connection with the typical register BR. As indicated, such registers comprise thirty flip-flops such as the flip-flop 433 to which the appropriate transfer signal TRDN is applied as a trigger, the set enable or reset enable leads being connected to the appropriate set and reset gate terminals. It will be apparent that all such registers in the destination series receive the set and reset enable signals, but only the one to which a "transfer-to-destination" signal is applied will be affected.

(V) PROGRAM INTERRUPT SYSTEM

Figure 16A:
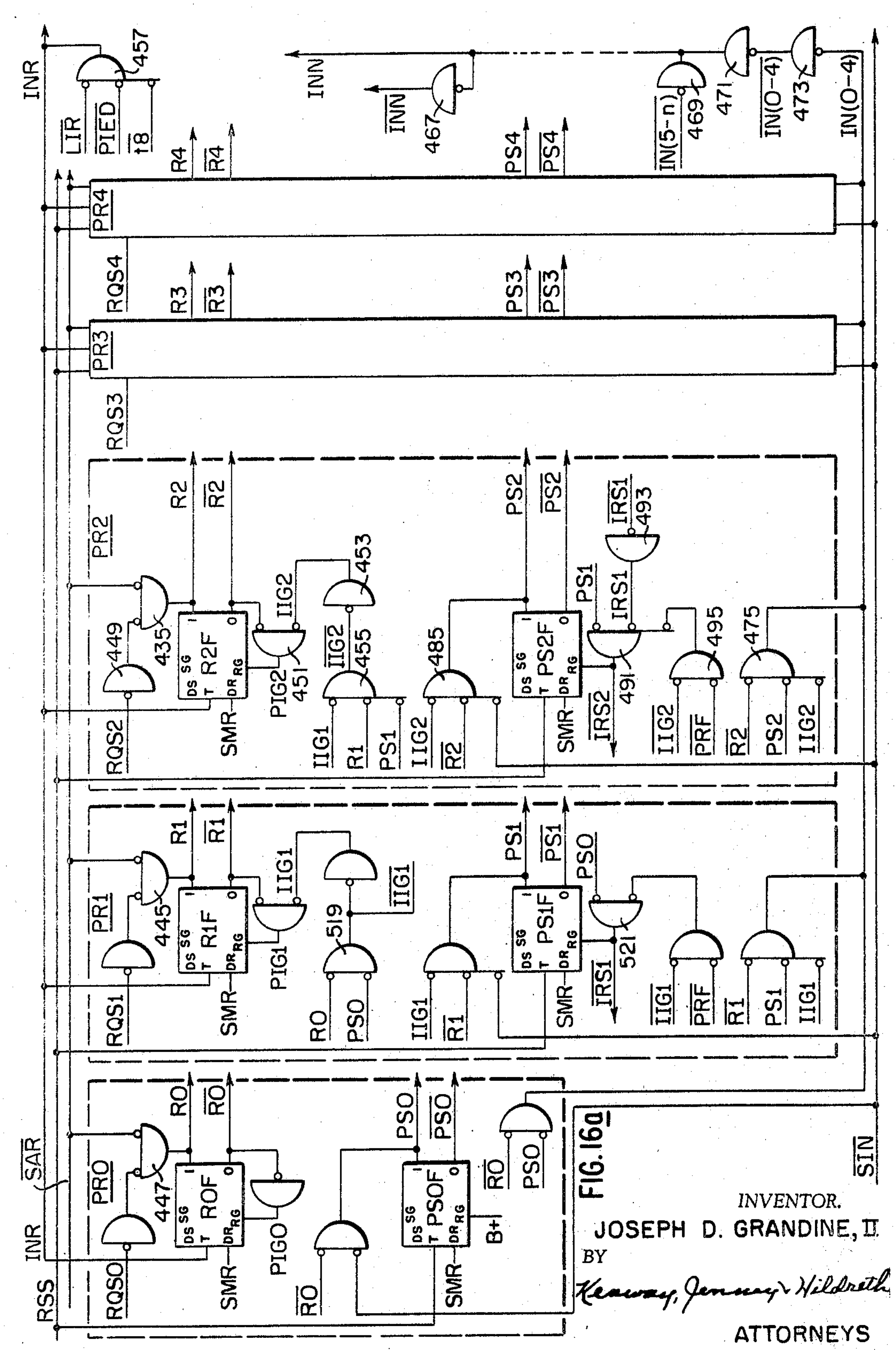

Referring now to FIGS. 16*a*, 16*b*, 16*c*, and 16*d*, the program interrupt system will next be described. Referring first to FIG. 16*a*, I have shown a system comprising five priority interrupt channels PR0 through PR4. Additional channels may be provided as desired. Circuits have been shown for the channels PR0, PR1 and PR2, it being understood that the circuits for PR2 are typical for all lower priority channels. Channel PR0 is the highest priority channel, and PR4 is the lowest priority channel in the series shown. As the circuits for channels PR0 and PR1 may be described as simplifications of the circuits for channel PR2, channel PR2 will first be described.

Each channel such as PR2 includes a flip-flop such as R2F for storing the information that service has been requested until an external instruction has been received by the system control unit. Each channel also includes a flip-flop such as PS2F for storing the information that service is in progress.

The flip-flop R2F is arranged to be directly set by a gate 435. This gate receives a signal $\overline{SAR}$, which when absent represents a sample request pulse from the system control unit. Referring to FIG. 16*d*, this pulse is generated at *t*9, by a gate 437 in the "pause" mode of operation and by a gate 439 in the "execute" portion of an operating cycle. The pulse SAR is used to reset a priority storage circuit comprising two gates 441 and 443 connected in front-to-back relationship, to provide the level $\overline{PRF}$ from the time the sample request signal SAR is produced until the circuit is set to produce the level PRF by circuits to be described.

Referring again to FIG. 16*a*, the signal $\overline{SAR}$ is supplied to each of a set of gates, one for each channel, such as the gate 435 in the channel PR2, the gate 445 in the channel PR1, and the gate 447 in the channel PR0. A second signal individual to each channel is supplied by a gate such as the gate 449 in the channel PR2 in response to a service request signal labelled RQS2 from an external device associated with channel 2. When this request is received, the flip-flop R2F is set.

The flip-flop R2F is arranged to be reset when an instruction is received from the system control unit. For this purpose, a trigger input signal INR is applied to all of the trigger terminals of the flip-flops including the flip-flops R2F and the corresponding flip-flops R1F and R0F. As will appear, only the flip-flop which is in the channel having the highest priority will be reset. To effect priority resetting, each flip-flop such as R2F is provided a reset gate such as 451 that is enabled when the flip-flop is set. An input signal IIG2 is applied to a second input terminal of the gate 451. Accordingly, when the signal IIG2 is absent and the flip-flop R2F is set, a reset gate input signal will be applied to the flip-flop to cause it to be reset when the pulse INR is received. The signal IIG2 is absent when all flip-flops in the higher priority channels have been reset. As shown, the signal IIG2 is formed by a gate 453 inverting the signal $\overline{IIG2}$ produced at the output terminal of a gate 455. The gate 455 receives the signals R1 and PS1 from the next highest priority channel, and a signal IIG1, absent when all flip-flops in channel PRO are reset.

The signal INR is produced by a gate 457 receiving the signals LIR, PIED and *t*8. The signal INR is thus produced when the load instruction signal LIR is present at *t*8, and a signal PIED has been produced as shown in FIG. 16*c*. As there shown, a flip-flop 459 is arranged to be set at *t*8 to produce the signal PIED when a "fetch priority instruction" signal FPI is present. The flip-flop 459 will be reset at the next *t*8 pulse after it has been set. The signal FPI is produced by a flip-flop 461 that is set at *t*8 by one of two gates 463 and 465. The gate 463 is effective in the "pause" mode of operation, and receives the signals $\overline{PSE}$, FPI and $\overline{INN}$. The signal $\overline{INN}$ is produced by a gate 467 in FIG. 16*a*. This gate produces the signal $\overline{INN}$ when the "interrupt necessary" signal INN is not produced by one of the gates such as 469 and 471 provided to invert levels such as $\overline{IN(0-4)}$ and $\overline{IN(5-N)}$. As shown for the gate 471, the input $\overline{IN(0-4)}$ is produced by a gate 473 having an input terminal connected to each of a set of gates such as the gate 475 for the channel PR2. The gate 475 will produce an output signal when the flip-flop R2F is set and the higher ordered flip-flops are not set. For the latter purpose it receives a signal IIG2. To turn off the level INN when service has been initiated for a channel, the signal PS2 is connected to the gate 475.

Returning now to FIG. 16*c*, it will be seen that the gate 463 operates in the "pause" mode when the flip-flop 461 is not set and the interrupt necesary signal is produced. The gate 465 functions in the execute portion of an operating cycle, when indirect addressing is not in effect, the destination selected is not D4, and the "interrupt necessary" signal INN is present and the signal FPI is absent. For this purpose, the gate 465 receives the signals $\overline{EXC}$, I1, D4 and $\overline{INN}$, and FPI.

As illustrated, the flip-flop 461 is arranged to be reset at the next time *t*8 after it has been set.

When the flip-flop 461 is set, signifying than an instruction is to be fetched from an external source, it is necessary to select the external instruction busses as the source for a data transfer to the memory data register MD. For this purpose, a flip-flop 481 is provided. This flip-flop may be a simple DC flip-flop formed by connecting two gates in front-to-back relationship. It is set at *t*9 when the signal FPI is present. For this purpose, the signal FPI is applied to a gate 477 having its output terminal connected to the reset terminal R of the flip-flop 481. The output terminal of the gate 477 is also connected to one input terminal of a gate 479, having a second input terminal connected to receive the signal *t*9. By this arrangement, the flip-flop 481 will be reset as soon as the flip-flop 461 is reset. The logic 1 output terminal of the flip-flop 481 produces the signal SS8, used to control the source code decoder in FIG. 14*d*. The level S8 employed in FIGS. 14*d* and 14*f* is produced by an inverting gate 483 having an input terminal connected to the logic 0 output terminal of flip-flop 481.

Referring again to FIG. 16*a*, the channels such as PR2 are provided with a service flip-flop such as the flip-flop PS2F that is arranged to be set when service is initiated, as indicated by the absence of the signal $\overline{SIN}$ applied to a gate for each of the channels such as the gate 485 in the channel PR2. The gate 485 also receives the signals $\overline{R2}$, absent when the flip-flop R2F has been set, and IIG2, absent when all higher ordered flip-flops have been reset.

Referring to FIG. 16*d*, the signal $\overline{SIN}$ is produced by a gate 487 inverting the signal SIN from a gate 489. The gate 489 receives the signals $\overline{MDL}$ and $\overline{FPI}$, indicating that the flip-flop 461 has been set and that a "memory data load" signal has been produced in a manner described above in connection with FIG. 11*a*. The signal SIN is employed to set the flip-flop comprising the gates 441 and 443, to produce the level PRF.

The flip-flops such as PS2F in the channel PR2 are arranged to be reset when a trigger pulse RSS is applied to their input trigger terminals such as T when either all higher priority flip-flops have been reset or the signal $\overline{PRF}$ is present. For this purpose, each flip-flop such as PS2F is provided with a reset gate such as 491 producing an output signal labelled $\overline{IRS2}$ when the flip-flop PS2F is to be reset. The gate 491 receives a signal PS1, absent when the flip-flop PS1F in channel PR1 is reset, and a signal IRS1, absent when either all higher ordered priority flip-flops have been reset or the signal $\overline{PRF}$ is present. The signal IRS1 is produced by gate 493 inverting the reset level $\overline{IRS1}$ for the next higher priority flip-flop PS1F. A third input terminal to the gate 491 is connected to the output terminal of a gate 495 that has input terminals connected to receive the signals $\overline{IIG2}$ and $\overline{PRF}$. As noted above, the signal $\overline{IIG2}$ is produced when all higher priority flip-flops have been reset, and the signal $\overline{PRF}$ is produced when the sample request pulse SAR is produced in the manner shown in FIG. 16*d*. The signal $\overline{PRF}$ is provided to ensure that the highest-ordered PS flip-flop is reset, by bridging the propogation time in the gating chain forming the resetting signals.

Figure 16B:
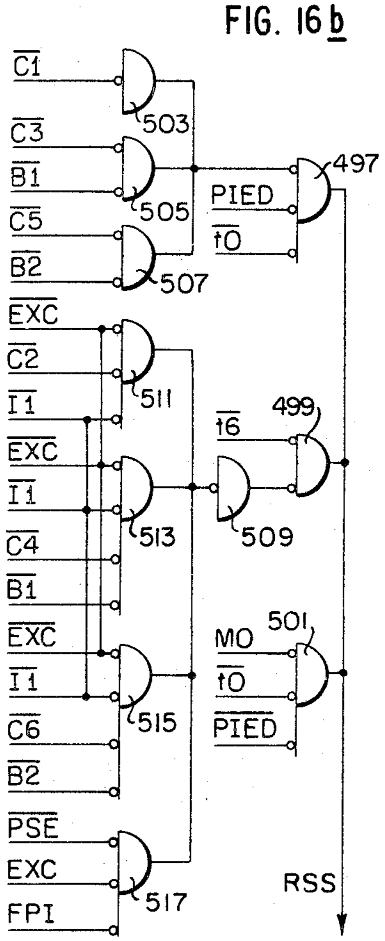
Figure 16D:
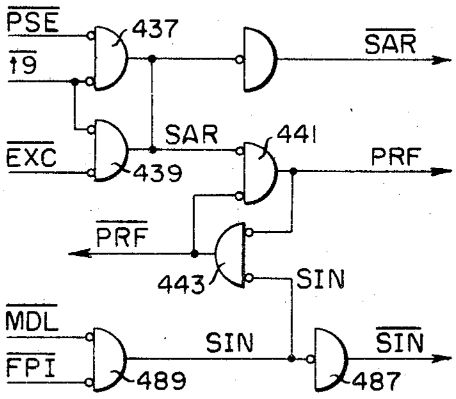
Figure 16C:
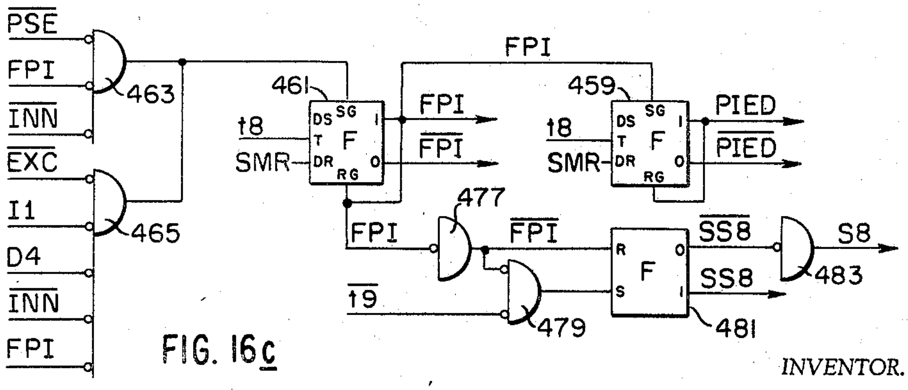

Referring now to FIG. 16*b*, the signal RSS may be produced by any of three gates 497, 499 and 501. The gate 497 receives the signals $\overline{t0}$ and $\overline{PIED}$, and has an additional input terminal connected to the output terminals of three gates 503, 505 and 507. The gate 503 receives the special operation code signal $\overline{C1}$, the gate 505 receives the signals $\overline{C3}$ and $\overline{B1}$, and the gate 507 receives the signals $\overline{C5}$ and $\overline{B2}$. The output signals from these gates are used to inhibit the gate 497 during the execution of special instructions including the operation codes C1, C3 and C5. These operation codes involves a jump to a sub-routine (JPSR).

The gate 501 receives the signals M0, $\overline{t0}$ and $\overline{PIED}$. One of the gates 497 and 501 will accordingly produce the signal RSS at *t0* with the flip-flop 459 set if the instruction mode is not M0, or, if it is M0, if the logical condition $\overline{C1}\cdot(\overline{C3}+\overline{B1})\cdot(\overline{C5}+\overline{B2})$ is met.

The signal RSS may also be produced at time *t6* by the gate 499 if its second input terminal is at logic 0. This input terminal is connected to the output terminal of a gate 509 inverting the output signals of four interconnected gates 511, 513, 515 and 517. Each of the gates 511, 513 and 515 receives the signal $\overline{EXC}$. The gates also receive the signal $\overline{I1}$. That is to reset the PS*n* service flip-flops when an indirect jump has been executed. The gate 511 receives the signal $\overline{C2}$, the gate 513 receives the signals $\overline{C4}$ and $\overline{B1}$ and the gate 515 receives the signals $\overline{C6}$ and $\overline{B2}$. C2 is an unconditional jump instruction, and C4 and C6 are conditional jump instructions, dependent on the branch conditions B1 and B2, respectively. The gate 517 operates during the pause mode, and receives the signals EXC, $\overline{PSE}$ and FPI. In this mode, only priority instructions are executed, so that the highest priority service flip-flop can be reset as soon as the machine is out of the execute mode and the flip-flop 461 has been reset.

Referring again to FIG. 16*a*, circuits for the priority channel PR1 are similar to those for the channel PR2 just described except that they are simpler in some respects. Specifically, the gate 519 for generating the signal $\overline{IIG1}$ is simpler than the gate 455 for generating the signal $\overline{IIG2}$ because there is no necessity to provide an input terminal to receive a signal IIG0, there being no channel higher in priority than the channel PR0. For the same reason, no gate such as 493 is needed in channel PR1, and the gate 521 corresponding to the gate 491 accordingly requires only two input terminals. Channel PR0 is even simpler, as there is no signal IIG0 needed in the reset chain for the flip-flop R0F and the reset gate for the flip-flop PS0 may be connected directly to a positive potential.

Referring next to FIG. 17, I have shown a typical array of external devices using the program interrupt sub-system. For priority channel 0, I have shown an interrupt service array 0 comprising an external device XD0 and an external instruction source XIS0. As an illustration of one use for the program interrupt system, I have shown the external device XD0 as simply comprising a gate 523 collecting the inputs $\overline{C14}$ through $\overline{C31}$ to produce a signal RQS0 to request service when any of the operation codes C14 through C31 are produced. In the particular system here described, these operation codes were not assigned, so that the production of one of them would be an error requiring correction. This request could be employed to cause the machine to execute an error sub-routine by an appropriate command. The instruction commanding such a sub-routine could be provided by the external instruction source XIS0, here shown as simply comprising a set of gates, one for each lead on the external instruction busses S8, such as the gates 525 and 527. When instructed by the setting of the appropriate flip-flop R0F to produce the signal R0, these gates supply an instruction from a suitable source, here shown as comprising a set of terminals such as 529 which may be jumpered or not as by the jumper 531 to a source potential in a pattern forming the desired instruction.

As a second example, I have illustrated an interrupt service array associated with any priority channel *n*. This array is shown as comprising an external device XD*n* including a serviced unit SU*n*, such as a typewriter, magnetic tape unit, or the like, capable of communicating with the buffer register BR through appropriate gates, and capable of control by one or more bits in the interface control register IC. The device SU*n* is provided with means for producing a request for service signal RQS when service is required. The signal may be applied to a suitable storage device such as the flip-flop 533, to produce the request for service signal RQS*n*. The flip-flop 533 may be reset by the signal PS*n* that is proposed when the corresponding flip-flop in the associated priority chain is set.

When the associated flip-flop R*n* in the priority chain is set, and all higher priority flip-flops are reset, an instruction is gated from an instruction source XIS*n* by the signal PIG*n*. The source XIS*n* may generate an instruction in any suitable fashion, as by the set of switches S*n*0 through S*n*29.

(VI) MEMORY SYSTEM

FIG. 18 shows schematically the memory sub-system DME and the associated memory data register MD. Since this memory sub-system may be of conventional design, it will not be shown in detail. However, it is preferably based on a core memory CM of suitable capacity, an associated memory control unit MC functioning under the control of the system control unit SCU, a memory address register MA of 15 bit capacity, and a location counter LC of 15 bit capacity capable of being incremented by appropriate signals. Control means are preferably provided for performing any of three core operations. First, directed by the signal RER, is a "read-restore" operation in which the contents of the address in the core memory that is stored in the memory address register is read into the memory data register, and, later, restored to the core memory. The second operation required is a "read-index-store" operation, directed by the signal RIS, in which the contents of the memory address register are indexed by one and transferred to MD, and later restored to the core memory. The third required operation is a "clear-write" operation in which data is taken from the data lines from a selected source and transferred to the memory data register, then later transferred to the core memory at the address specified by the memory address register. In the specific embodiment described, the "read-restore" operation required 2 microseconds, the "read-index-store" operation required 2.5 microseconds, and the "clear-write" operation required 2.0 microseconds.

The memory sub-system is further required to perform one of five memory cycles. In response to an "MD load" signal MDL, the memory data register MD is loaded from the selected source and no transaction with the core memory takes place. However, the "clear-write" mode must be selected. In response to a "jump" command, no transaction takes place with the core memory, and the contents of bits 15 through 29 of the register MD are loaded into the location counter LC. In response to a command to jump to a sub-routine, the contents of bits 15 through 29 of the memory data register are transferred to the memory address register, the contents of the core memory at this address are transferred to MD, and the contents of the location counter are then transferred to bits 15 through 29 of MD. The contents of MD are then transferred to the core memory at the address specified by the memory address register, and the contents of the memory address register plus 1 are transferred to the counter LC. In response to the "random addressing" signal RAND, the contents of bits 15 through 29 of the memory data register are transferred to the memory address register. In response to the "sequential addressing" signal SEQ, the contents of the location counter are transmitted to the memory address register, and the location counter LC is incremented by 1. The "random" and "sequential" addressing cycles may be used with any of the available core operations.

(VII) THE HYBRID ARRAY

(A) Construction

Referring now to FIG. 19, I have shown a typical hybrid array 21. In the embodiment here shown, the control register CR comprises a 30 bit register D5R assigned the destination D5, and a portion of a 30 bit register D6R assigned the destination D6. The value register comprises a 15 bit register D7R assigned the destination D7, and two 30 bit registers D8R and D9R assigned the destinations D8 and D9 respectively. The output register comprises a single 15 bits register S5R having a source assignment S5. The sense lines S4[26] through S4[29] are connected to detect overflow and overrange conditions.

The array 21 is shown capable of dealing with any of seven variables $y1$ through $y7$, each represented by an analog voltage proportional to the magnitude of the variable. These voltages are connected to input terminals of a multiplexing circuit AMX1, where one of them is selected for connection to the output terminal 537 of the multiplexing circuit in dependence on which of a set of control bits J has the value logic 1. The bits J comprises 7 bits taken from locations 8 through 14 in the control register D6R. The selected signal applied to the output terminal 537 of the multiplexing circuit AMX1 is applied as one input to each of three hybrid computing elements ACE1, ACE2 and CMP, to be described.

A second set of analog variables $x1$ through $x7$ is similarly applied to the input terminals of a second multiplexing circuit AMX2, where one of them is selected under the control of a digital control word comprising the seven bits 16 through 22 stored in the control register D6R. The outputs of the multiplexing circuit AMX2 are also applied to the three hybrid computing elements ACE1, ACE2 and CMP.

The hybrid computing element ACE1 is adapted to receive up to 6 analog input signals, and to either multiply or divide any set of these 6 by a digital value D supplied from the value register D9R under the control for an 8 bit digital command from the control register D5R. One of the input signals so multiplied or divided may be initially in digital form, as indicated by the signal E supplied by the value register D9R through a conventional digital-to analog converter DAC1. The output of the hybrid computing element ACE1 is connected to input terminals of the hybrid computing elements ACE2 and CMP. The construction and operation of the hybrid computing element ACE2 and the associated digital-to-analog converter DAC2 may be the same as described in connection with the units ACE1 and DAC1.

The hybrid computing element CMP is a comparator functioning to produce the analog algebraic sum of a digital number A supplied from the value register D7R and any of six analog input signals. An output is provided proportional to the sum, and a sign bit is provided on the sense line S4[27].

The output of the comparator CMP is supplied to a "sample-and-hold" circuit SAH, which may function in either a sample or a hold mode under control of one bit of an applied digital control signal N from the control register D6R, and produce an analog output signal at any one of six analog output leads $r1$ through $r6$ as selected by the remaining bits of the control word N. These outputs signals may be supplied to any desired set of six loads L0 through L5.

As shown in FIG. 19, seven unassigned terminals U1 through U7 are provided. These perform no function in the embodiment shown, but permit modification of the array to handle an extended array of input signals when desired.

In the computer here described, all positive numbers are expressed as binary fractions between 0 and 1, and all negative numbers are expressed as the 1's complement of the corresponding fraction with an additional logic 1 bit to represent the negative sign. Any number N would thus be expressed as $$N=Ao2^0+\sum_{j=1}^{m}[Ao(1-Ai)+Ai(1-Ao)]2^{-i}$$

where $Ao$ represents the sign, $m$ is the number of bits used to represent the number, and $j$ is an index numbering the bits. For example, the decimal fraction +.65625 would be represented as 0.10101 in binary form, and −.65625 would be represented as 1.01010. As will appear, the hybrid computing elements ACE1 and ACE2 are so constructed as to function properly with numbers represented in this form.

Referring next to FIG. 20, I have shown a typical hybrid computing element ACE corresponding to the units ACE1 and ACE2 in FIG. 19. The circuit has been shown generalized for any number of input terminals. This unit is described in more detail and claimed in copending application Ser. No. 503,291 filed Oct. 23, 1965 now Patent No. 3,470,487 by Paul G. Lucas and Robert P. Talambiras for Hybrid Computer and assigned to the assignee of my application.

The hybrid computing element ACE is provided with $n$ input terminals for receiving $n$ analog input signals $x1$ through $xn$. Each of these input terminals is connected through a summing resistor such as $Rx1$ and a digitally controlled switch schematically shown at 539 to a summing terminal 541. Each of the switches such as 539 is controlled by one of a set of $n$ control bits C2 through C($n$+1). The switches such as 539 may be any conventional electronic switching circuits capable of closing the path between the associated resistor and a summing terminal when the control bit is logic 1, and opening the path when it is logic 0.

The terminal 541 serves as an input terminal for a conventional summing amplifier 543 having a feedback resistor 545 to produce an output signal at a terminal 553 that is proportional to the signal at the lead 541. The output terminal 553 is connected to the input terminal 561 of the amplifier 565 over paths selected in dependence on the states of a control bit C1 and the bit $Ao$ representing the sign of the digital value. The bit C1 determines the function of the unit. If C1 is logic 1, the analog input is divided by the digital value input, if logic 0, the analog input is multiplied by the digital value.

If A$o$ is logic 1, indicating a negative number, an electronic switch 559, of any conventional construction is closed to connect the terminal 553 to the terminal 561 over a path including in series a resistor 549, a conventional inverting amplifier 547 having a feedback resistor 551, and a summing resistor 556. The feedback resistor 551 is selected in relation to other circuit constants to produce an inverted signal at the terminal 561 equal to minus one times the analog input signal. When the unit functions as a divider, the amplifier 547 simply inverts the analog input signal to produce a signal of the correct sign when dividing by a negative number. When the unit functions as a multiplier, the path controlled by the switch 559 also serves to compensate for the use of one's complements, in a manner to be described.

When C1 is logic 1, and A$o$ is logic 0, a gate 560 produces a logic 1 signal to close an electronic switch 557 of conventional construction. When the switch 557 is closed, a summing resistor 538 is connected between the terminals 553 and 561, providing a non-inverted input signal to the amplifier 565 equal to the analog input signal for use when dividing by a positive number.

The terminal 553 serves as the input terminal of an attenuator having an output terminal 561. The conductance of the attenuator between the terminals 553 and 561 is determined by the number of a set of switches SM1 through SM$m$ that are closed. Each of these switches serves to connect a different resistor of a set RM1 through RM$m$ between the terminal 553 and the terminal 561. These resistors are proportioned such that the conductance of the network is made proportional to the number represented in binary fashion by the digits of a group of digital signals controlling the switches SM1 through SM$m$. These digital signals are at times supplied by a group of $m$ gates such as an initial gate MG1 and a final gate MG$m$, which are enabled when a control bit C1 is logic 0. The second input to each of the $m$ gates MG1 through MG$m$ is supplied by a set of $m$ digital value signals $\overline{A1}$ through $\overline{Am}$.

The terminal 561 serves the input terminal to an amplifier 565 of the inverting type and having an output terminal 567. The output terminal 567 is returned to the input terminal 561 through a degenerative digitally controlled attenuator network comprising a set of $m$ resistors RD1 through RD$m$ each connectable between the terminals 561 and 567 when an associated electronic switch SD1 through SD$m$ is closed. These switches are controlled by a set of digital signals produced at times by a set of $m$ gate sets DG1 through DG$m$.

As shown for the typical gate set DG1, these gate sets each comprises three gates having output terminals connected together. A first gate receives the signal C1, to produce a logic 1 output signal when the apparatus is in the "multiply" state and thereby close all of the switches SD to divide by one when multiplying by any value. Since the input to the feedback attenuator would be .111 . . .1 in this case, and not 1 exactly, an additional trimming resistor, not shown, may also be switched in when C1 is logic 0 to make the dividing factor exactly 1.

The other two gates in the gate sets such as DG1 are provided to compensate for the representation of negative numbers by their complements. One gate receives the bit value signal such as A1 and the sign bit $\overline{Ao}$, and the other receives the complement of the value signal, such as $\overline{A1}$, and the sign bit A$o$. The result is that a positive number is copied into corresponding states of the switches SD, and a negative number is complemented.

The output terminal 567 of the amplifier 565 is connected through an isolating amplifier 569 to a relay 571 having a contact $a$ closed when energized to produce an overflow signal bit. This signal is used to indicate to the computer that an attempt has been made to carry on an operation beyond the capacity of the computing element ACE.

The terminal 567 is connected through an electronic switch 573 to an output terminal $r$. The switch 573 is controlled by a control bit C$o$.

The operation of the computing element ACE produces an analog output signal on a terminal $r$ which is equal to a function of the input analog variables $x1$ through $xn$, and the digital input signals A$o$ through A$m$, that is determined by the control digital signals C$o$ through C($m$+1). Specifically, the signal C$o$ is employed to connect the output terminal $r$ to the input terminals through the network selected by the other digital input signals. The signal $C_1$ is used to determine whether the unit will operate as a multiplier or as a divider. If $C_1$ is logic 0, the gates MG$o$ through MG$m$ will be enabled, and the apparatus will act as a multiplier. If the bit $C_1$ is logic 1, the gates DG1 through DG$m$ will be enabled, and the apparatus will act as a divider.

When the unit is functioning to multiply an analog signal $x$ by a digital number $-A$ represented as $$1+\sum_{i=1}^{m}(1-Ai2)^{-i}$$

the attenuator alone would produce an input signal S to the amplifier 565 given by $$S=x\left(\sum_{i=1}^{m}2^{-i}-\sum_{i=1}^{m}Ai2^{-i}\right)$$

The inverting amplifier 547, effective when A$o$ is logic 1 and the switch 559 is closed, serves to subtract the term $$x\sum_{i=1}^{m}2^{-1},$$

whereby the correct product, —A$x$, is supplied to the amplifier 565.

A set of control signals $C_2$ through C$n$+1 is employed to select any of the inputs $x1$ through $xn$ for summing at the junction 541. In multiplication, the conductance of the input attenuator between the terminals 553 and 561 is proportional to the digital value represented by the signals A$o$ through A$m$. Thus, the signal at terminal 553 will be multiplied by a value proportional to the digital signal if multiplication is selected. The conductance of the feedback network for the amplifier 565 is also proportional to the digital value A$o$ through A$m$. If division is selected, the signal at terminal 553 will thus be divided by a value which is proportional to the digital input signal.

In view of the structure described above, the output signal $r$ can be expressed as the following function of the input signals:

$$r=Co\left[C_1AB+\frac{(1-C_1)B}{A}\right]$$

where $$A=+(1-Ao)\sum_{j=1}^{m}Aj2^{-j}-Ao\sum_{j=1}^{m}Aj2^{-j}$$

and $$B=\sum_{i=2}^{n+1}CiXii-1$$

in which $i$ and $j$ are indices numbering the variables, $X_i$ are analog signals, and the C's and A's are digital signals, the latter being expressed as a positive fraction between 0 and 1 for both positive and negative numbers and being negative if A$o$ is 1.

Referring next to FIG. 21, I have shown schematically a circuit which might be used for the multiplexing unit AMX. Such units are known and the circuit illustrated is for explanatory purposes only. For example, U.S. Patent No. 3,135,874, issued on June 2, 1964 to Paul G. Lucas and Sherman Rigby for Control Circuits for Electronic Switches shows a suitable multiplexing unit in detail.

As shown, each of the input analog variables *y*1 through *y*7 is selectively connectable to an output terminal 575 when an associated switch SA1 through SA7 is closed by a logic 1 bit applied to a control terminal of the switch. Thus, the switch SA1 is closed when the bit J0 is logic 1 and the switch SA7 is closed when the bit J6 is logic 1. In practice, only one of the input terminals J0 through J6 is made positive.

FIG. 22 shows schematically sample-and-hold circuits such as might be used in the array of FIG. 19. As shown, the input voltage *e*1 is supplied through a digitally controlled switch 579 to capacitor 581. When the digital control bit N*o* is logic 1, the switch 579 is closed and the apparatus operates in a sampling mode. When the control signal N*o* is logic 0, the switch 579 is closed and the apparatus operates in a hold mode in which the voltage across the capacitor 581 remains constant for a time selected to be adequate for practical computing purposes. The voltage across the capacitor 581 is supplied to any of six output terminals *r*1 through *r*6 by closure of an associated switch such as 583 under the control of one of a set of six digital control signals $N_1$ through $N_6$, only one of which is normally made positive.

Referring now to FIG. 23, the comparator CMP is shown in more detail. This unit may comprise a set of six input terminals to which analog voltages *e*1 through *e*5 are applied. These signals are connected through switches SP1 through SP5 and summing resistors RP1 through RP5 to a summing terminal 585. A digital input signal on 15 leads A0 through A14 is supplied through a conventional digital-to-analog converter DAC, a switch SP6 and a resistor RP6 to the summing terminal 585. It will be apparent that the voltage on terminal 585 will be proportional to the sum of the voltages on the leads through which the associated switches are closed. The voltage on the lead 585 is applied to an analog output terminal *e*0 through an amplifier 587 and a switch 589. The latter is controlled by a digital bit C0, which when positive causes the comparator CMP to operate and produce its output signal. Means such as a gate 591 is provided to produce a digital signal signal.

(B) Operation

Having described the various components of the hybrid computing array of FIG. 19, its operation will next be described. The general expression for the digital output signal R or the analog output signal of the set *r*1 through *r*6 is a function of the digital input signals A, B, C, D and E, the analog inputs *y*1 through *y*7 and *x*1 through *x*7 and the unassigned inputs *u*1 through *u*7, as determined by the control expression stored in the control register CR. The control expressions desired for a particular application are stored in the memory CM. (FIG. 13) Prior to operation of the array to perform the function designated by a particular control expression, the value registers are loaded from memory with the digital variables to be operated on. The portion of the control expression to be stored in the register D6 is then loaded, and finally the remainder of control expression is loaded into the register D5R. This register contains a bit D5[0] that causes the units ACE1, ACE2 and CMP to operate, as by closing the switch 573 in the unit ACE shown in FIG. 20. One of the bits in the register D6, such as D6[23], may be changed, under program control, first to a value setting the sample-and-hold unit to its "sample" mode, and, after a suitable setting time, to its "hold" mode to store a computation result. Alternatively, as in one specific embodiment of our invention, one bit in the interface control register IC was used for this purpose.

The source output from the register S5R may be transferred back to memory for storage, and a new set of values loaded in for operation with the same or different control expression in the control register CR. It will be apparent that this array is capable of a great many useful mathematical transformations on the variables. One useful set of control expressions is given in Table III below, in which for brevity the control word is given as the octal value, requiring conversion to binary notation for representation in the apparatus.

TABLE III

| Control Word | Expression |
|---|---|
| 40000 40020 | $x_I$ |
| 40000 40021 | $A+x_I$ |
| 40000 42003 | $A+Bx_I$ |
| 40000 62000 | $B(C+x_I)$ |
| 40000 60003 | $A+BC$ |
| 40000 00001 | $A$ |
| 40000 40060 | $x_I+y_J$ |
| 40000 40061 | $A+x_I+y_J$ |
| 40020 42006 | $Bx_I+Dy_J$ |
| 40120 62206 | $B(C+x_I)+(D(E+y_J)$ |
| 40020 42007 | $A+Bx_I+Dy_J$ |
| 40100 40402 | $BDE$ |
| 40100 60007 | $A+DE+BC$ |
| 40020 40423 | $A+x_I+BDy_J$ |
| 40011 44206 | $x_I/D+y_J/B$ |
| 40111 64206 | $E+x_I)/D+(C+y_J)/B$ |
| 40031 46266 | $(x_I+y_J)\ (1/D+1+1/B)$ |
| 40101 60207 | $A+E/D+C/B$ |
| 40240 62206 | $(C+x_I)/B+(E+y_J).D$ |
| 40000 42222 | $x_I(1+1/b)$ |
| 40010 42626 | $x_I(1+D)(1+1/B)$ |
| 40121 42007 | $A+Bx+(E+y_J)/D$ |
| 40121 62006 | $B(C+x_I)+(E+y_J)/D$ |
| 40101 40403 | $A+BE/D$ |

To illustrate the meaning of the entires in Table III above, consider the control word 40121 62006. Translating to binary code, the control word as stored in the register D5 becomes:

| Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| Value | 1 | 0 | 0 | 0 | 0 | 0 | 0 | 0 | 0 | 0 | 1 | 0 | 0 | 0 | 1 | 1 | 1 | 0 | 0 | 1 | 0 | 0 | 0 | 0 | 0 | 0 | 0 | 1 | 1 | 0 |

The first bit controls operation of the units ACE1, ACE2, and CMP. Bits 1 through 7 are unused. Bits 8 through 13 select analog inputs to the unit ACE1 in the order downwardly in FIG. 19; referring to FIG. 19, it will be seen that the output signal from the digital-to-analog converter DAC1, or the analog value of the digital signal E, and the output of the unit AMX1 are selected. Bit 14 is the multiply-divide control for the unit ACE1; logic 1 directs division. Bit 15 is the "convert" control for the analog-to-digital converter ADC. Bits 16–21 select the analog inputs to the unit ACE2; as shown above, the analog counterpart of the digital input C and the output of the unit AMX2 are selected. Bit 22 selects multiplication or division in the unit ACE2; here, multiplication is selected. Bits 23 through 28 select analog inputs to the unit CMP, in the order upwards in FIG. 19; here, the outputs of the units ACE1 and ACE2 are selected. Bit 29 selects the digital input to the unit CMP; as it is logic 0, no digital input is provided. The digital output R is, therefore, given by $$R=B(C+x_I)+\frac{(E+y_J)}{D}$$

where $x_I$ and $y_J$ are the variables selected by the logic 1 bits in the portion of the control expression stored in the register D6R. The significance of the other control expressions given above may be determined in the same manner.

(VIII) COMPUTER OPERATION

Having described the apparatus of the preferred embodiment of my invention, its operation under typical circumstances will be described with reference to FIGS. 1 through 23 and the timing diagrams FIGS. 24*a*, 24*b* and 24*c*.

FIG. 24*a* illustrates the basic timing cycle for the full machine cycle MC3. Referring to FIGS. 4, 5 and 24*a*, assuming that the system is started by momentarily actuating the run switch in FIG. 4 to set the flip-flop 43, the flip-flop 45 in FIG. 4 will be set to produce the signal ESTRT. With this signal present, at the next occurrence of $\overline{\text{CLI}}$, the flip-flop 47 will be set to produce the signal STRT. With this signal present, at the next time the pulse CLI is positive, the flip-flop TR1 in FIG. 5 will be set to produce the signal A. The pulses AX, B, BX, C, CX, D, DX, E and EX will be sequentially produced as shown in FIG. 24*a*. The pulses *t*0, *t*3, *t*6, *t*8 and *t*9 will occur as illustrated in FIG. 24*a*. If the machine cycle MC2 is selected, the pulse D would occur following the pulse BX and the pulses C and CX would be omitted, to shorten the machine cycle by one-half microsecond. If the machine cycle MC1 was selected, D would be the first pulse produced after the start signal and it would be repeated during the latter portion of the EX pulse. A one microsecond machine cycle would thus be produced including the timing pulses *t*6, *t*8 and *t*9.

Referring to FIG. 24*b*, the fetching and execution of a typical instruction is illustrated. Assume that the instruction selected is "clear AR and add A," represented by 010001000000000 in the order in which the bits appear in the instruction diagram of FIG. 2, followed by a 15 bit address A specifying the memory address whose contents is to be added to the accumulator. The timing sequence is started at *t*8, at which time the execution of the last instruction will have been completed. The level EXC then goes down, and the level FI is produced by the setting of the flip-flop 263 in FIG. 12, at time *t*8. With the level FI present, the level RER will be produced by the gate 263 in FIG. 10*b* to cause a "read-restore" transaction between MD and the core memory CM in the memory sub-system DME. At the next pulse *t*0, the flip-flop 134 in FIG. 5 will be set by the gate 136 to produce the level HMP. With this flip-flop set, the gate 221 will enable the gate 219 in FIG. 9*a* to remove the level SEQ, initiating a sequential memory addressing operation. During this operation, an instruction will be fetched from memory, at the address located in the memory address register, and stored in the memory data register MD.

At the next occurring pulse *t*8, the flip-flop 263 in FIG. 12 will be reset to remove the level FI, and the flip-flop 269 will be set to the execute state. At the same time, the flip-flop 193 in FIG. 7 will be set to produce the level LIR to load the instruction register. The desired instruction will then be loaded into the instruction register.

In the example given, the instruction mode code is M1, and the lead M1 will be at logic 1 potential at the output of the instruction load decoder 353 in FIG. 14*b*. The destination selected will be D1, or the destination register of the accumulator AR. The source will be S0, or the memory data register MD. The rotation, transfer, index and indirect address bits will all be 0. Accordingly, the contents of the source will be copied into the destination at the appropriate time without rotation, transfer, indexing or indirect addressing. At the next *t*9 in the "execution" portion of the cycle, a sample request pulse SAR will be generated, but it will be assumed that no request for service from the program interrupt system is present. At the next following t0, the signal RAND, directing a random addressing memory cycle, will be generated. The signal RAND will be generated when the flip-flop 134 in FIG. 5 is set at *t*0 with gate 239 enabled by the presence of the execute level EXC, and with the instruction mode code M1 and the source S0 levels present. Gates 235 and 237 will both have logic 0 outputs, so that the level $\overline{\text{RAND}}$ will disappear.

The signal RER will continue to be produced when the signal EXC appears, since the index bit is 0 in the instruction register and the gate 267 will be enabled at that time to enable the gate 263 to remove the signal $\overline{\text{RER}}$. A "read-restore" memory operation will then take place beginning with the fetching of the contents of the address stored in the address portion of the memory data register MD and corresponding to the instruction fetched into the memory data register MD. At the next *t*0 pulse, the flip-flop 193 in FIG. 7 will be reset to remove the level LIR. At the same *t*0 pulse, the level RAND will be produced and the random addressing operation will take place in which the address portion in bits 15 through 29 of the memory data register corresponding to the instruction previously fetched is loaded into the memory address register. The contents of this address will then be read into the memory data register. At the next following *t*8 time, the signal FI will be produced and the signal EXC will be removed. At the following *t*9 time, the signal TRD will be produced by gate 289 in FIG. 12, since there is a logic 1 signal MO at the input of the gate 283 and the flip-flop 277 will be set at the preceding time *t*8. The signal TRD1 will then be produced by the gate 431 in FIG. 15*a* and the contents of the memory data register will be copied into the destination register of the accumulator AR. As the machine proceeds to fetch the next instruction, the contents of the location counter LC will then be transferred to the memory address register MA, and the contents of the location counter incremented to the next address (i.e. sequential addressing). The addition operation will be completed at the next *t*3 time, when the pulse DTR will be produced, causing the number in the destination register of the accumulator AR to be added to the number in the source register of the accumulator.

FIG. 24*c* illustrates the sequence of operations taking place when a typical instruction is executed and a request for service is received from the program interrupt system. It is assumed that the insruction has been fetched and that it comprises an instruction in which the mode is M1, the destination is D2, the source is S2, the rotation code is R2 for a 6 bit left rotation, the transfer logic is T0, an index bit is present and the indirect address bit is missing. This instruction is expressed in octal form as 22242. The purpose of the instruction is to rotate the contents of the buffer register BR left 6 bits and increment the contents of the memory location identified in the address portion of the instruction. As illustrated in FIG. 24*c*, when this instruction is loaded into the instruction register at time *t*8 by the signal LIR, the machine cycle MC2 is changed to the cycle MC3 (as a consequence of a 1 in bit 14 of IR). The signal MC3 is generated by the gate 179 in FIG. 6, since the operation code is not M3 and the index bit and the level EXC are present. A full machine cycle will then take place.

Since the index bit is present, the level RER will be replaced by the level RIS during this memory cycle. The signal RIS is produced by the gate 273 in FIG. 10*c*. It is assumed that a signal RSQ1 appears at *t*8. At *t*9, the sample request signal SAR is produced by the gate 439 in FIG. 16*d*. At this time, the level PRF is set. At the same time, the flip-flop R1F in the priority channel PR1 is set and the interrupt necessary signal INN is accordingly produced by the gate 467.

Meanwhile, the execution of the instruction in the instruction register proceeds, and at *t*0 the level RAND will be produced by the gates 235 and 237 in FIG. 9*b*. The level HMP will be present because the flip-flop 134 in FIG. 5 is set at *t*0. The gate 237 will be enabled by the gate 243 in response to the contents of the instruction register in the execution portion of the cycle. Accordingly, a "random addressing" operation will take place with the address portion of the instruction in the memory data register being loaded into the memory address register MA. During the memory cycle, the contents of this address will be loaded into MD and incremented by 1, then later restored to the same address in memory. At the next *t*9 time, the signal TRD will be produced by the gate 289 in FIG. 12, causing the buffer register to be read through the source selection gates, through the rotation control gates set to rotate the contents 6 bits left, and copied through the transfer logic control gates back into the buffer register BR. Referring to FIG. 15*b*, it will be seen that the "set enable" and "reset enable" signals are applied to the set and reset gate terminals of the flip-flops such as 433 in the buffer register. Since these levels are applied by the digital data channel from the time the instruction is settled in the instruction register, by the time the signal TRD2 is produced the correct transfer will take place even though the contents of the buffer register itself is being changed. In this manner, no difficulty is encountered in selecting the same register as both the source and the destination.

Prior to the completion of the execution of the instruction, at time t8, the flip-flop 269 in FIG. 12 is reset and the flip-flop 61 in FIG. 16*c* is set to produce the signal FPI. Referring to FIG. 1, this action causes the gate 159 to produce the signal MC1, selecting a one microsecond machine cycle in which the external instruction is loaded from the selected source XIS1 on the external instruction busses S8 into the memory data register MD. Referring to FIG. 11*a*, the signal MDL is produced at *t6* with the FPI level present by the gates 275 and 277. Referring to FIG. 10*a* the removal of signal MDL causes the memory control signal CLW to be produced. The signal MDL also causes the level PRF to be set by the signal SIN produced by the gate 489 in FIG. 16*d*. At the same time, the flip-flop PS1 is set. In the one microsecond machine cycle selected, the next pulse following *t9 ti t6*. At the following *t8* time the "priority execution delay" flip-flop 459 is set to produce the level PIED, causing the gate 457 in FIG. 16*a* to produce the "instruction received" signal INR to reset the flip-flop R1. At the same time, the "load instruction register" signal LIR is produced and the external instruction now in the memory data register is transferred to the instruction register. At the following *t9* pulse, the sample request signal SAR is produced by the gate 439 in FIG. 16*d* and the level PRF is removed. The level $\overline{PRF}$ applied to the resetting gate series for the flip-flop PS1F now enables the flip-flop PS1 to be reset when the signal RSS is received. What will occur next depends on the nature of the external instruction. Assuming that it is not a C1, C3 or C5 special instruction, the signal RSS will be produced at the next following *t0* time to reset the flip-flop PS1F.

While I have described my invention with respect to the specific details of a preferred embodiment thereof, many changes and variations will become apparent to those skilled in the art upon reading my description, and such can obviously be made without departing from the scope of my invention.

Having thus described my invention, what I claim is:

1. A general purpose hybrid computer comprising, in combination:

an array of hybrid computing elements, said array comprising an input register to accept input signals in digital form, at least one input terminal to accept signals in analog form, an output register for providing digital output signals at least one output terminal for providing an analog output signal, and a hybrid computing network interconnecting said registers and terminals to produce output signals in accordance with a function of the input signals; and a stored program electronic digital computer of the source-destination type, said computer including a memory device for the storage of computer programs and digital data, a plurality of digital source registers including said hybrid array output register and at least one register associated with said memory, a plurality of digital destination registers including said hybrid array input register and at least one register associated with said memory, and a single digital data channel connecting a selected one of said source registers to a selected one of said destination registers in response to control signals generated by said digital computer in response to a program command.

2. The combination defined in claim 1 in which said memory device is a random access memory device.

3. The combination defined in claim 1 which includes means for performing logical operations on digital data as it is transferred from a selected source to a selected destination.

4. The combination defined in claim 1 in which the configuration of said computing network is controllable in response to digital commands, and means connecting at least one of said digital destination registers to said array to thereby control the configuration of said array in response to commands from said digital computer.

5. A general purpose hybrid computer, comprising an array of hybrid computing elements, each element comprising a set of analog input terminals, a digital control register, a digital value register, an analog output terminal, a set of analog computing elements, switching means controlled by said register for interconnecting said analog computing elements in an array between said terminals for producing at said output terminal a signal that is a function determined by the contents of said control register of the signals applied to said input terminals and the contents of said value register, a digital computer of the source-destination type having addressable memory means, a memory data register connected to said memory means addressing means for writing information from said memory data register into said memory means and reading information from said memory means into said memory data register, an instruction register, means for loading said instruction register from said memory data register, and a digital data channel selectively connectable between a set of source terminal sets and a set of destination terminal sets, one of said source sets and a first of said destination sets being connected to said memory data register to permit the exchange of data between the memory data register and other sources and destinations, and means controlled by said instruction register for operatively connecting a source terminal set and a destination terminal set selected in dependence on the contents of said instruction register to said digital data channel, a second of said destination terminal sets being connected to said control register and a third of said destination terminal sets being connected to said value register, whereby a series of hybrid computations may be performed in accordance with a series of instructions stored in said memory means.

6. The apparatus of claim 5, further comprising an output register for storing a digital code, and an analog-to-digital converter connected between the output terminal of said computing network and said output register to store a digital output code in said register corresponding to the output signal on said terminal.

7. The apparatus of claim 5, further comprising an output register for storing a digital code, an analog-to-digital converter connected between the output terminal of said computing network and said output register to store a digital output code in said register corresponding to the output signal on said terminal, and in which a second of said source terminal sets is connected to said output register.

8. A hybrid computer, comprising addressable memory means for storing a set of words comprising a program of instructions and lists of data and computation results, a memory data register for storing a word in said set, an instruction register for storing an instruction from said set, a digital data channel having input and output terminals for transmitting a word in said set, a hybrid computing array comprising a value register, a control register, an output register, multiple transfer function hybrid computer means settable to perform any of a predetermined series of functions and responsive to a plurality of applied analog signals and the contents of said value register to produce an analog output signal that is an analog function of a set of said signals and said value register contents, means controlled by the contents of said control register for selecting said function and said set, an analog-to-digital converter controlled by said computer for storing a digital code in said output register corresponding to said analog output signal, switching means controlled by said instruction register for connecting the input terminals of said data channel to said output register or to said memory data register in dependence on the contents of said instruction register, switching means controlled by the contents of said instruction register for connecting the output of said data channel to said memory data register, said value register, or said control register in dependence on the contents of said instruction register, and sequencing means controlled by said instruction register for sequentially transferring instructions from said memory means to said memory data register and from said memory data register to said instruction register to cause transfers of data between said registers other than said instruction register as determined by the stored program whereby a sequence of hybrid computations may be carried out.

9. The apparatus of claim 8, in which said digital data channel comprises digitally controllable means for performing logical transformations on the transmitted words, and further comprising means controlled by said instruction register for selecting the transformation performed by said digitally controllable means.

10. In a digital data channel, a set of source selection gates controlled by a group of sets of input terminals and a digital source selection code for gating one of said sets selected by said code to a first set of output terminals, a set of rotation control gates connected between said first set of output terminals and a second set of output terminals and controlled by an applied rotation code for gating said first set of output terminals to said second set of output terminals in an order determined by said rotation code, and a set of transfer logic gates controlled by a transfer code connected between said second set of output terminals and a corresponding set of pairs of data transfer terminals for gating signals which are a logical function of a digital signal on said second set of terminals to said data transfer terminals, said function being determined by said transfer code.

11. The apparatus of claim 10, in which said set of transfer logic gates is connected in an array sufficient to produce, in combination with said rotation control gates, a set of logical functions sufficient for general purpose computation.

12. In combination with the apparatus of claim 10, a set of destination registers each comprising a bistable register for each of said pairs of transfer terminals, each of said bistable registers in each destination register being connected to a different pair of transfer terminals and settable in response to an applied gating signal to a first state by a signal on one of said transfer terminals and to a second state by a signal on the other of said transfer terminals, and gating means controlled by an applied destination code for supplying a gating signal to each of the bistable registers in a destination register selected by the destination code.

13. In combination, a digital computer of the source-destination type having addressable memory means, a memory data register connected to said memory means, addressing means for writing information from said memory data register into said memory means and reading information from said memory means into said memory data register, an instruction register, transfer means for loading said instruction register from said memory data register, a digital data channel selectively connectable between a set of source terminal sets and a set of destination terminal sets, one of said source sets and a first of said destination sets being connected to said memory data register to permit the exchange of data between the memory data register and other sources and destinations, an interrupt register settable to a first and a second state, means controlled by said instruction register and said interrupt register in its first state for operatively connecting a source terminal set and a destination teminal set selected in dependence on the contents of said instruction register to said digital data channel, an external instruction source, a source of external service request signals, and program interrupt means responsive to each service request signal for setting said interrupt register to its second state and connecting said digital data channel between said external instruction source and said memory data register to store an external instruction in said memory data register, and means controlled by said interrupt register in its second state for actuating said transfer means to load the external instruction into said instruction register.

14. In combination, a digital computer of the source-destination type having addressable memory means for storing a program of instructions and digital data, a memory data register connected to said memory means, addressing means for writing information from said memory data register into said memory means and reading information from said memory means into said memory data register, an instruction register, first transfer means for loading said instruction register from said memory data register, a digital data channel selectively connectable between a set of source terminal sets and a set of destination terminal sets, one of said source sets and a first of said destination sets being connected to said memory data register to permit the transfer of data between the memory data register and other sources and destinations, an interrupt register settable to a first and a second state, means controlled by said instruction register and said interrupt register in its first state for operatively connecting a source terminal set and destination terminal set selected in dependence on the contents of said instruction register to said digital data channel, means for producing sampling pulses at intervals convenient for the interruption of programmed operation of the computer, a set of external instruction busses, a plurality of external instruction sources for producing instruction defining service to be performed by said computer, a corresponding plurality of sources of external service request signals, a program interrupt system comprising a request register and a service register each settable to first and second states for each source of service request signals, said registers being assigned predetermined priorities gating means controlled by said sampling pulses and said service request signals for setting the request registers to their second state when the corresponding service request signal is present and a sampling pulse occurs, means controlled by each request register in its second state for setting said interrupt register to its second state, means controlled by said registers for gating to said external instruction busses the external instruction source corresponding to the highest priority request register in its second state when all higher request and service registers are in their first states, second transfer means controlled by said interrupt register in its second state for connecting said digital data channel between said busses and said memory data register to load an external instruction from the selected source into said memory data register, means controlled by said second transfer means, said registers, and said interrupt register in its second state for setting to its second state the service register associated with the request register in its second state having a higher priority than any other request register in its second state, means controlled by said interrupt register in its second state and said first transfer means for loading an external instruction in said memory data register into said instruction register, means controlled by said last recited means for setting to its first state the request register in its second state having a higher priority than any other request register in its second state when said instruction register is loaded with an external instruction, means for resetting said interrupt register to its first state a predetermined time after it is set to its second state, and means controlled by said registers and said computer for setting the corresponding service register to its first state when the service defined by a corresponding external instruction in the instruction register has been performed.

15. In combination with a digital computer of the stored program, source-destination type having a digital data channel provided with input terminals and output terminals, source-selecting means for gating the input terminals to output terminals of a set of digital signal sources, destination selecting means for gating the output terminals to input terminals of a set of digital destination registers, an instruction register, and decoding means settable to a first state and a second state and controlled by said instruction register in its first state for actuating said source and destination selecting means to gate a source and destination to said data channel selected in dependence on an instruction stored in said instruction register, program interrupt means for selectively supplying instructions defining service to be performed by said computer to said instruction register from a set of instruction sources having ordered priorities, said interrupt means comprising a priority channel for each source, each channel comprising a request register and a service register each settable to first and second states, means responsive to an applied service request signal for each channel for setting said request register to its second state, means controlled by each request register in its second state and all register in higher priority channels in their first states for setting said decoding means to its second state and connecting the digital data channel between the instruction source selected by the highest priority request register in its second state and a predetermined destination register to transfer an external instruction to said predetermined register, means controlled by said last named means for setting to its second state the service register corresponding to the highest priority request register in its second state, time delay means controlled by the setting of a request register to its second state for loading the instruction register from the predetermined destination register after the latter has been loaded from an instruction source, means controlled by said time delay means and said registers for resetting to its first state the highest priority request register in its second state when the instruction register has been loaded as last recited, and means controlled by said registers and said computer for resetting to its first state the highest priority service register in its second state when the service defined by an external instruction in the instruction register has been performed.

16. A program interrupt sub-system for use with a digital computer of the source-destination type and having an instruction register and a digital data channel with input and output circuit selectively connectable to a series of sets of source terminals and destination registers, respectively, comprising a set of busses connected to one of said source terminal sets, a set of external instruction sources for producing instructions defining service to be performed by the computer, a set of ordered pairs of priority registers, one pair for each external instruction source, each pair comprising a first and a second register each settable to a first and a second state, a set of sources of service requests, one for each pair of priority registers, each source operative when actuated to set a first register in a different one of said pairs to its second state, means controlled by said registers for connecting a source to said busses, means connecting the input circuit of said digital data channel to said busses, and means connecting the output circuits of said channel to a predetermined destination register, said source being selected by said predetermined register, means controlled by the highest priority first register in its second state when all higher priority registers are in their first states and responsive to the loading of an external instruction into said predetermined register for setting to its second state the second register corresponding to the first register selecting the source, time delay means controlled by each of the first registers in its second state for loading an external instruction stored in said predetermined register into said instruction register, means controlled by said time delay means and said registers for resetting the highest priority first register to its first state when an external instruction has been loaded into said instruction register, and means controlled by said registers and said computer for resetting to its first state the highest priority second register in its second state when the service defined by an external instruction has been performed by the computer.

17. A program interrupt sub-system for providing service by a digital computer to an array of external devices in response to service request signals from said devices on the basis of preassigned service priorities, the requested service being defined by external instructions provided by an external instruction source associated with each external device, said computer comprising an instruction register and means for executing instructions stored in said register, said sub-system comprising request storage means for each external device for storing service request signals, means controlled by said request storage means for supplying an instruction from an external instruction source corresponding to the highest priority request storage means having a stored request signal to the instruction register and clearing the highest priority request storage means, service storage means for each external device for storing a service signal, means controlled by said storage means and responsive to storage of an external instruction in said instruction register for supplying a service signal to the service storage means corresponding to the device being serviced, and means controlled by said storage means and said instruction executing means for clearing the highest priority service storage means storing a service signal when the service defined by an external instruction has been performed.

References Cited

UNITED STATES PATENTS

| | | | |
|---|---|---|---|
| 3,034,719 | 5/1962 | Anfenger et al. | 235—150.5 X |
| 3,146,343 | 8/1964 | Young | 235—150.52 X |
| 3,317,717 | 5/1967 | Schumann | 235—150.5 X |

MALCOLM A. MORRISON, Primary Examiner

J. F. RUGGIERO, Assistant Examiner

U.S. Cl. X.R.

235—151.1